Figure 1A:
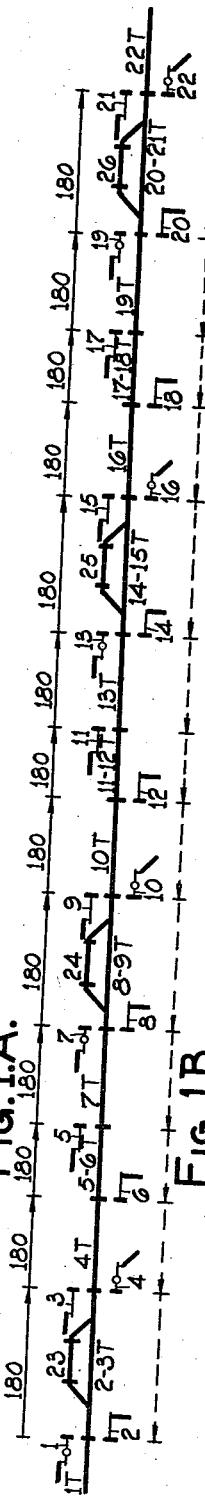

April 27, 1943.   N. B. COLEY   2,317,732
CODED TRACK CIRCUIT SIGNALING SYSTEM
Filed Sept. 30, 1941   9 Sheets-Sheet 1

INVENTOR
N. B. Coley,
BY Neil W. Priston,
his ATTORNEY

April 27, 1943.  N. B. COLEY  2,317,732
CODED TRACK CIRCUIT SIGNALING SYSTEM
Filed Sept. 30, 1941  9 Sheets-Sheet 2
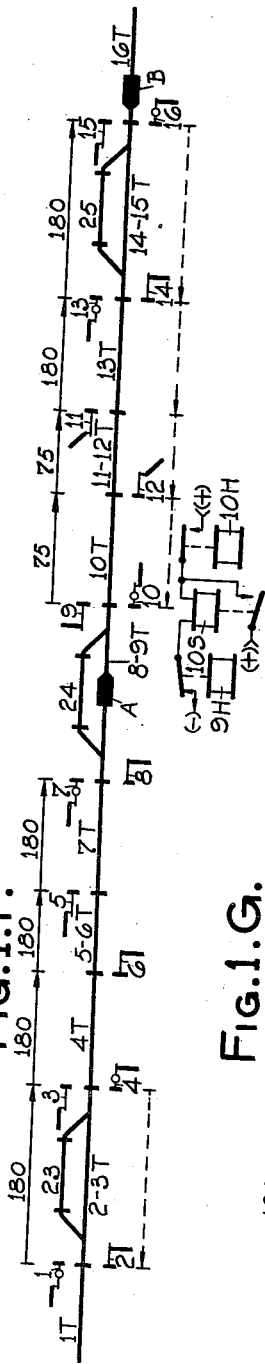
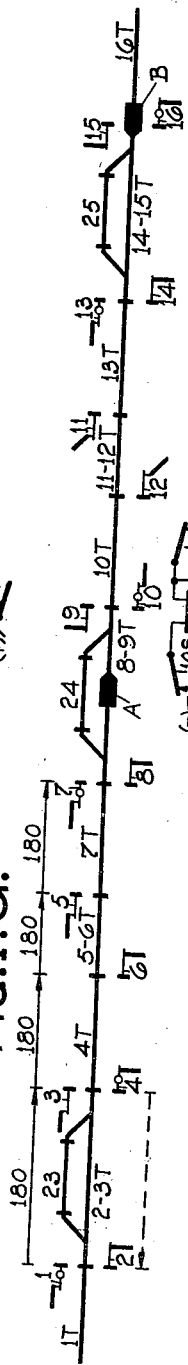
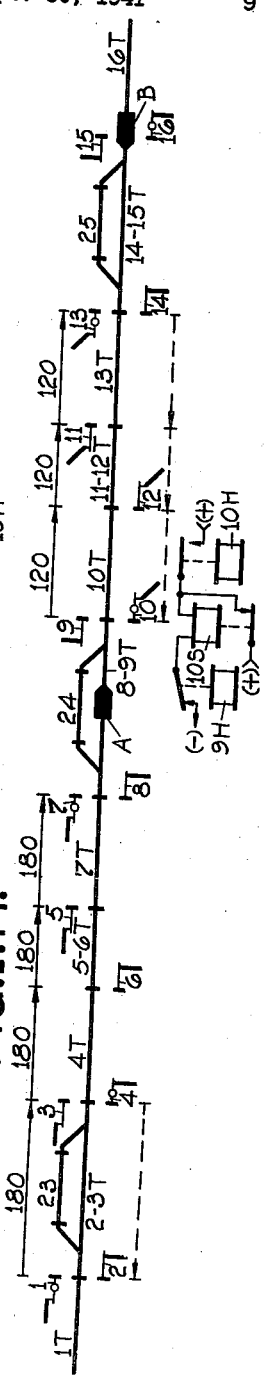
INVENTOR
N. B. Coley,
BY Neil W. Preston,
his ATTORNEY April 27, 1943.  N. B. COLEY  2,317,732
CODED TRACK CIRCUIT SIGNALING SYSTEM
Filed Sept. 30, 1941  9 Sheets-Sheet 3
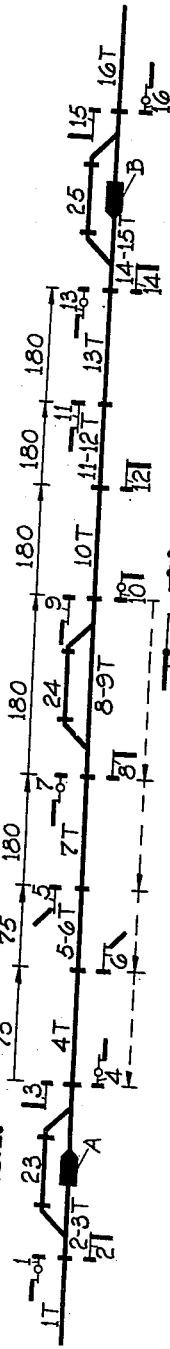
Fig.1.I.
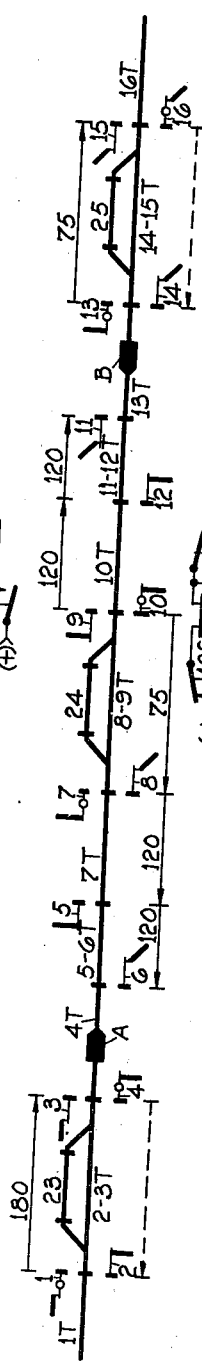
Fig.1.J.
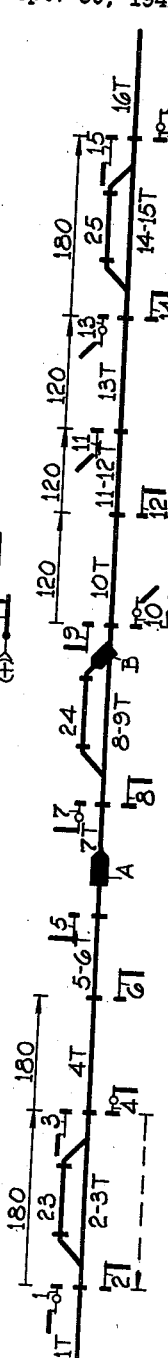
Fig.1.K.
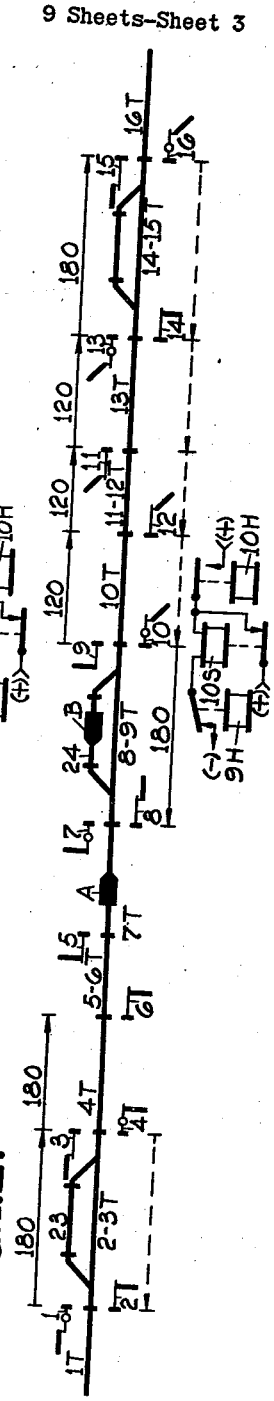
Fig.1.L.
INVENTOR
N. B. Coley,
BY Neil W. Preston,
his ATTORNEY

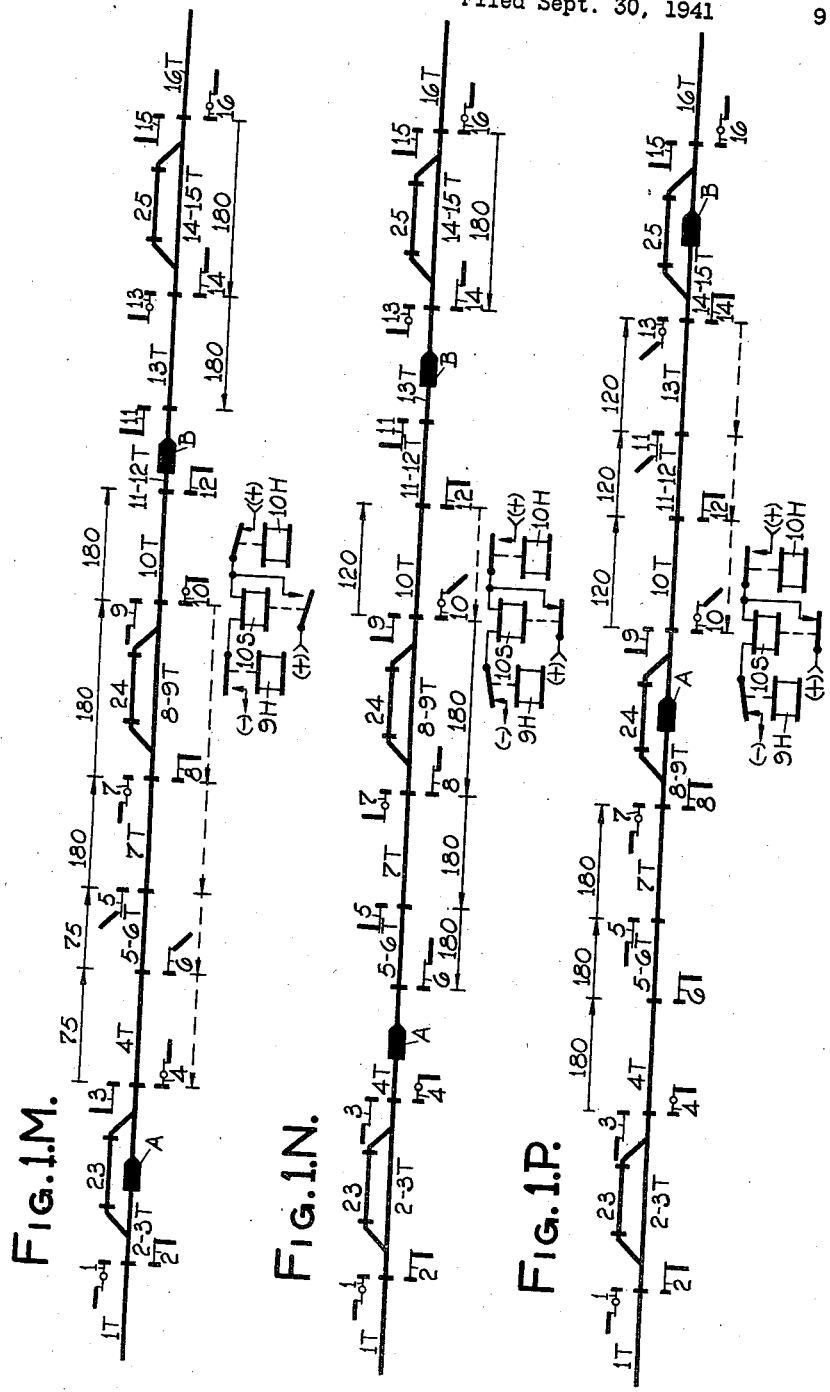

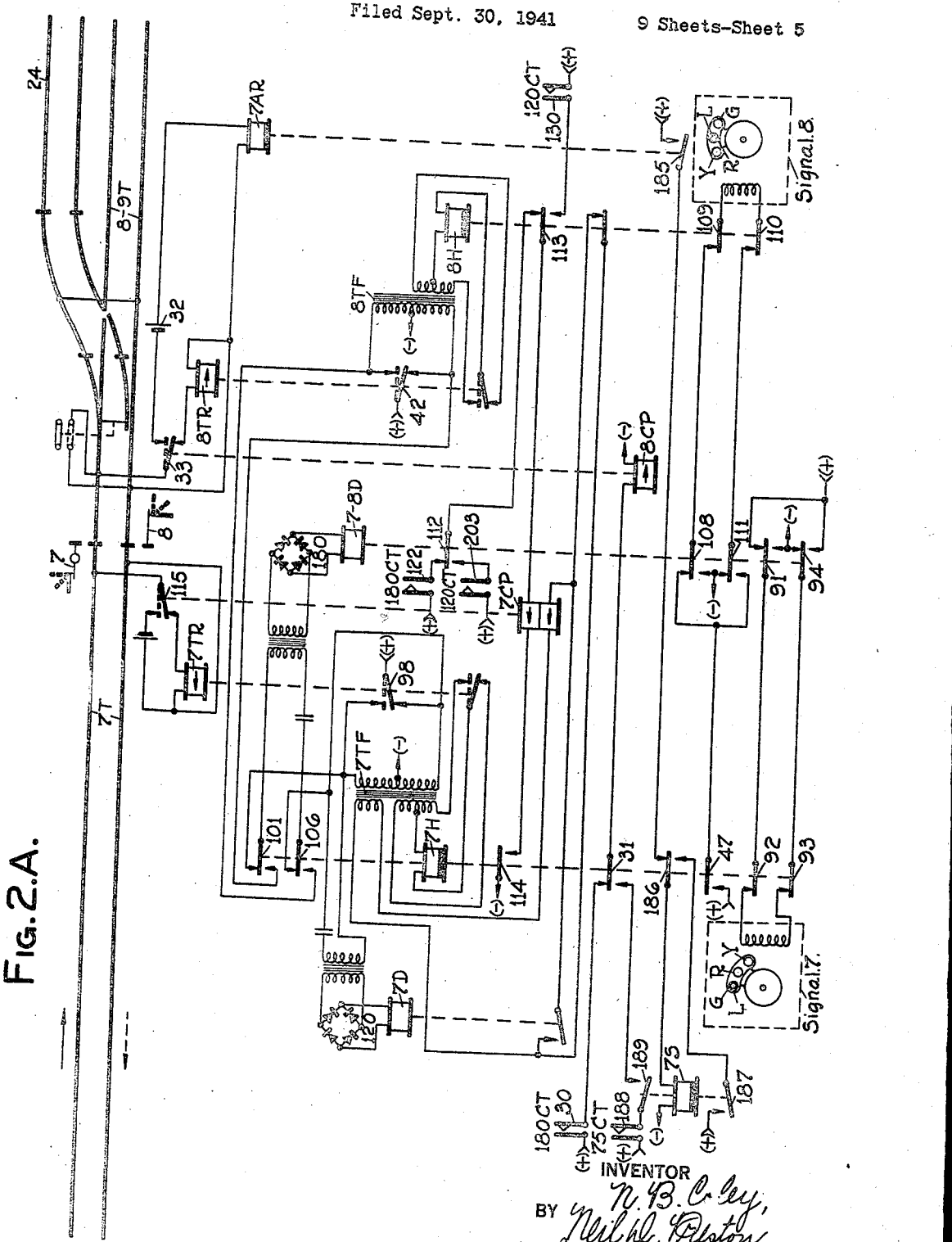

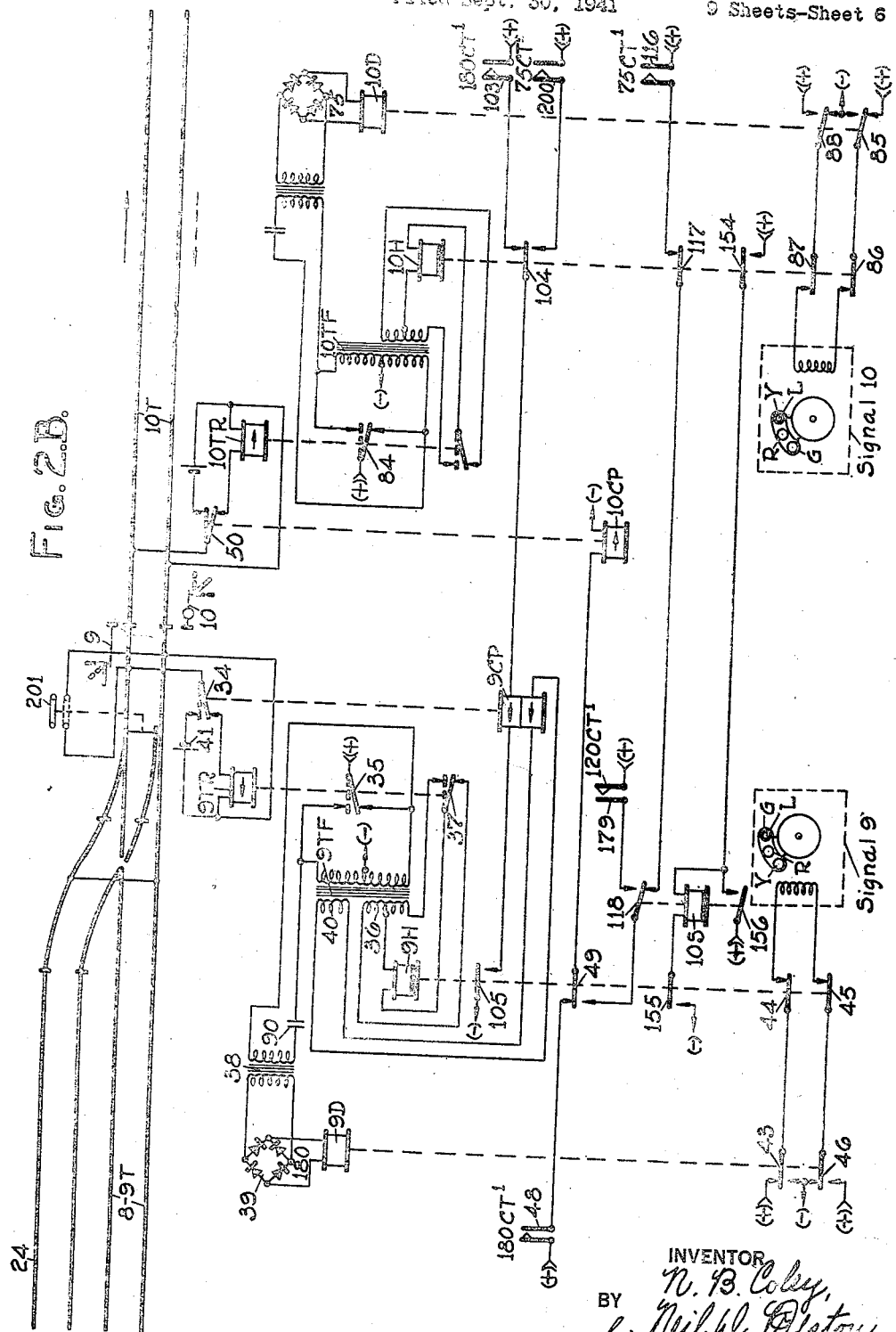

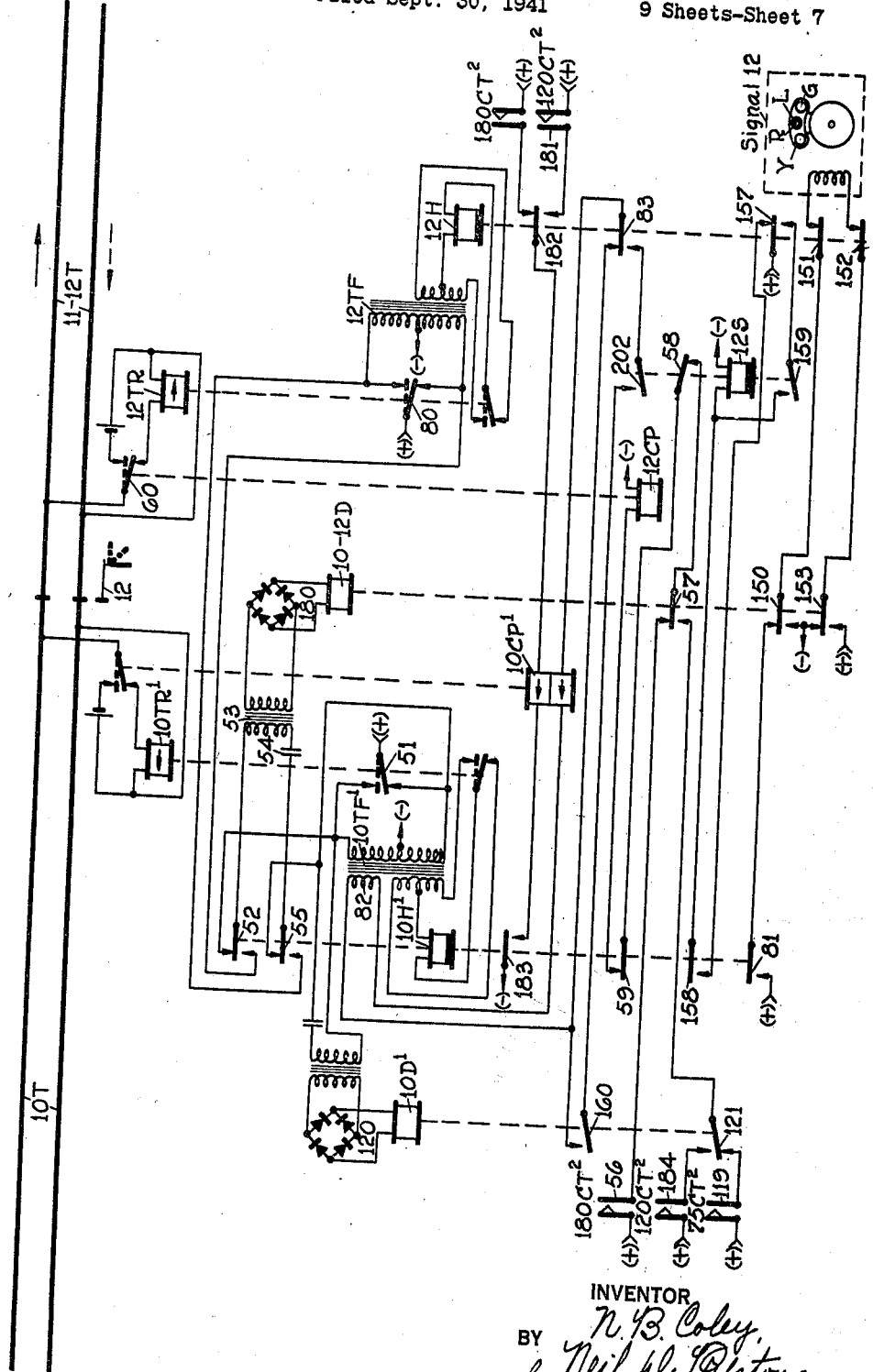

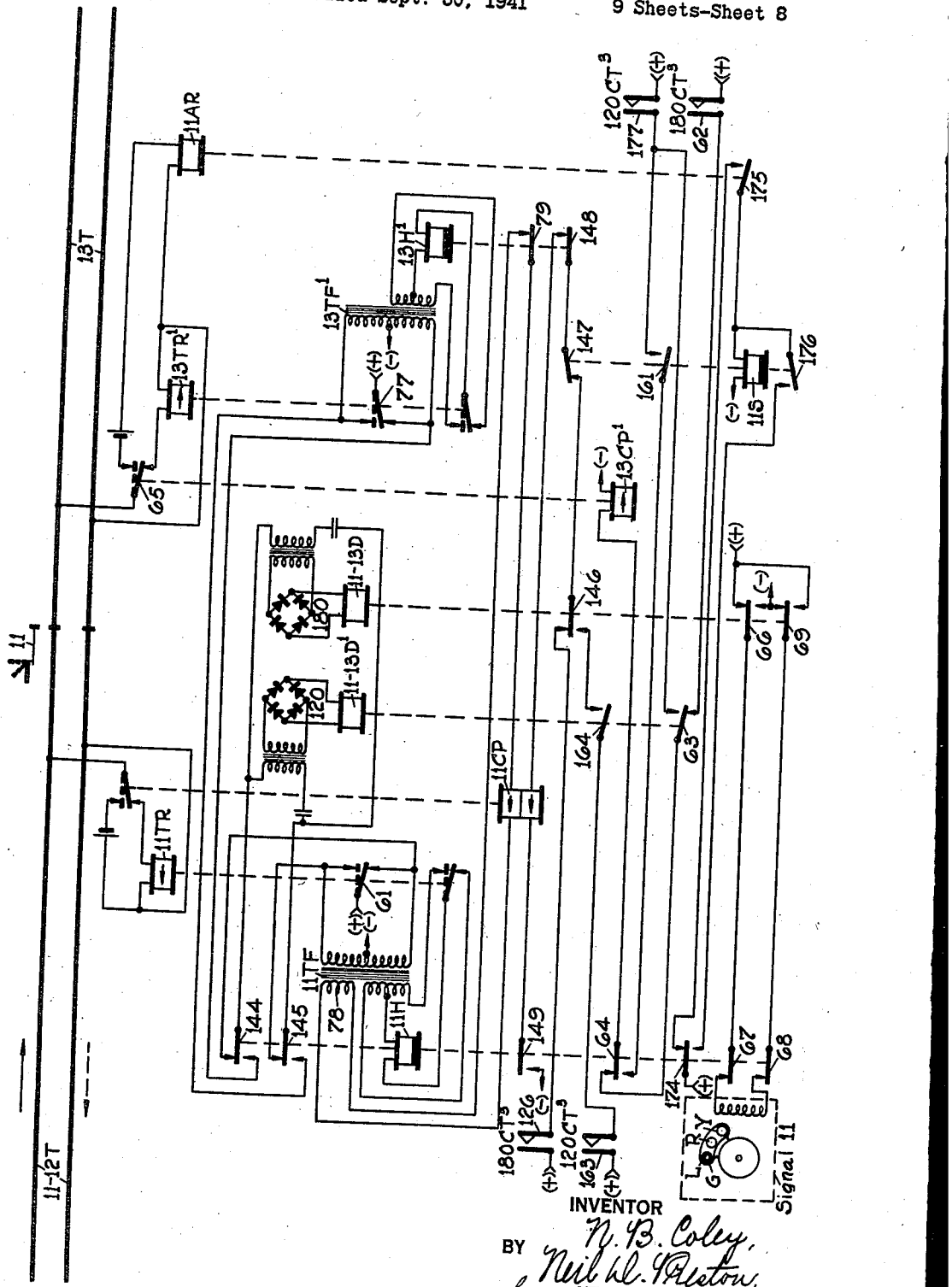

April 27, 1943.　　　　　N. B. COLEY　　　　　2,317,732
CODED TRACK CIRCUIT SIGNALING SYSTEM
Filed Sept. 30, 1941　　　9 Sheets-Sheet 9
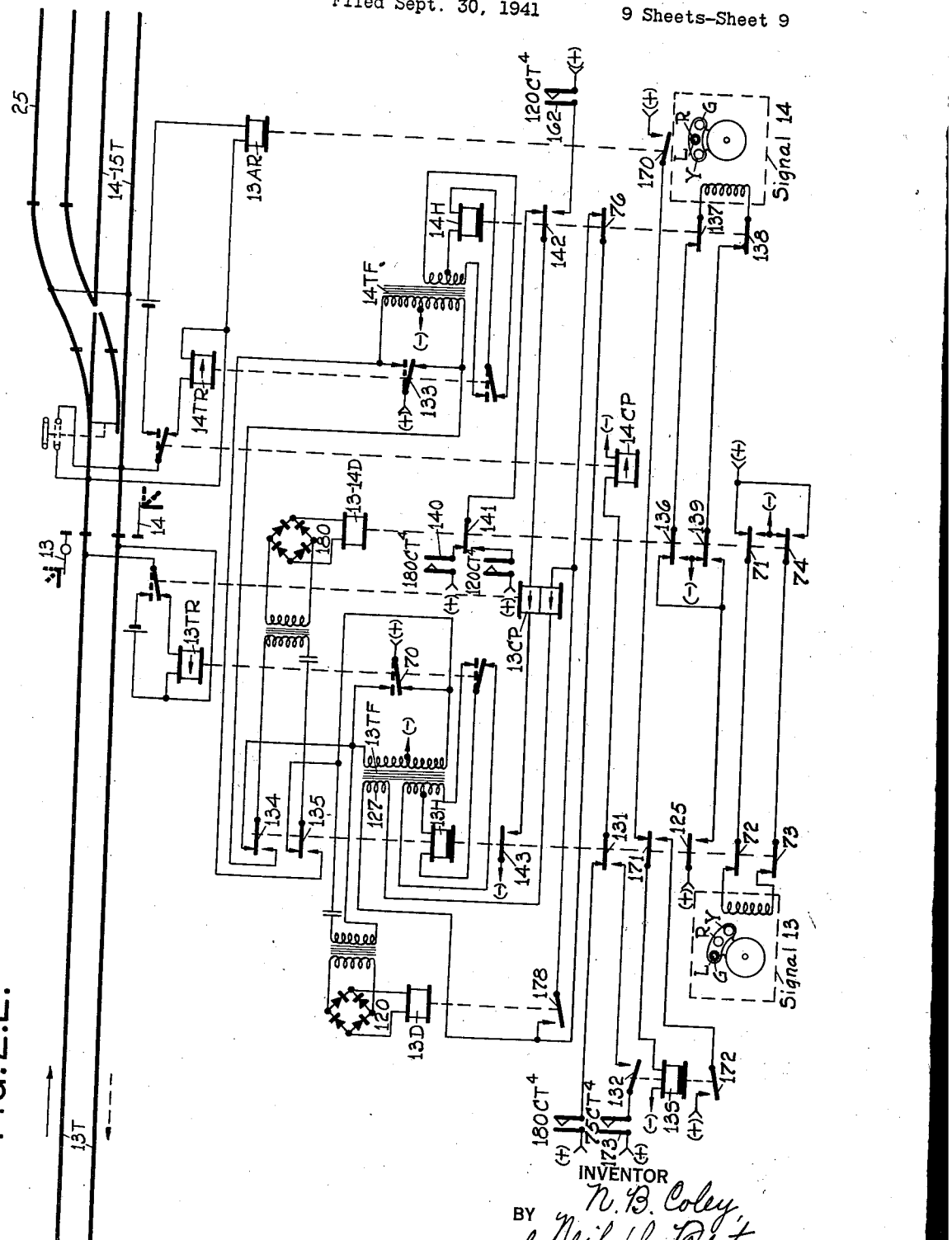
Fig. 2.E.
INVENTOR
N. B. Coley
BY Neil W. Ralston
his ATTORNEY Patented Apr. 27, 1943

2,317,732

UNITED STATES PATENT OFFICE 2,317,732

CODED TRACK CIRCUIT SIGNALING SYSTEM

Nelson B. Coley, Rochester, N. Y., assignor to General Railway Signal Company, Rochester, N. Y.

Application September 30, 1941, Serial No. 413,018

17 Claims. (Cl. 246—33)

This invention relates to block signaling systems for railroads, and it more particularly pertains to systems of the absolute permissive block type having coded track circuits.

In the usual type of absolute-permissive-block signaling systems using line wires and steadily energized track circuits, it is required that extra line wires be employed to provide overlap controls where a stretch of single track between sidings is so short as not to provide double braking distance between opposing intermediate signals. The simultaneous entry of opposing trains into a stretch of single track between sidings where overlap controls are not provided allows each train to receive a clear signal for governing entrance to such stretch of track because entrance must be made in order to cause the usual absolute-permissive-block tumble-down. Braking distance must therefore be provided beyond the intermediate signal for each direction of traffic. Where coded track circuits are employed instead of line wires, similar problems exist for short stretches of single track between sidings, and the additional overlap controls where short stretches of track between sidings are involved must be communicated by additional codes or by other coded track circuit means.

An object of the present invention is to provide an absolute-permissive-block signaling system applicable to short as well as long stretches of track between sidings, using only coded track circuits for the communication of signal controls between signal locations. Without attempting to define the scope of the present invention, the extra overlap controls for both directions of traffic are provided by a circuit organization involving the use of a special stick relay for one end of each stretch of single track between sidings. The control of that stick relay is such that it is picked up when there is a possibility of the simultaneous entry of trains. The picking up of the stick relay is effective by changing the codes transmitted through the various track sections, to restrict the indication displayed by the signal governing passage into the stretch of track at each end to a caution indication. By this arrangement, signaling can be safely provided for a stretch of single track between sidings which has as few as two blocks. Under such conditions no braking distance is required between the opposing intermediate signals as caution indications are provided in case of simultaneous entry of opposing trains for the signals governing passage of such trains into the stretch of single track.

In the coded track circuit system provided by the present invention, each coded track circuit has at each end thereof a code transmitter and a code receiver. Each of the code transmitters is adapted to transmit a "driven" code when rendered operative for that purpose, a "driven" code being transmitted when the pulsing of the code transmitter is effective as a repeater of a pulsing device at that end of the track circuit. The length of each impulse and the number of impulses per minute of a "driven" code is determined by the characteristics of the pulsing device with which such transmitter is associated. Certain of the code transmitters are adapted to transmit "inverse" codes, an "inverse" code being transmitted when the pulsing of the code transmitter is effected as a result of the reception of a driven code transmitted from the opposite end of that track section. The impulses of the inverse codes are synchronized to be applied to the track circuit during the "off" periods of the driven code transmitted from the opposite end of that track section.

Another object of the present invention is to provide a means for governing the direction of "driven" code transmission through the various track sections in such a manner as to use the driven codes to best advantage for governing signals in advance of trains. More specifically, the system provides for a normal direction of driven code transmission in each of the track sections, and provides for a reversal of the direction of driven code transmission under certain traffic conditions. After passage of a train, the direction of driven code transmission is restored to normal.

Another object of the present invention is to provide for the restoration of the normal direction of code transmission in the track sections in such a manner as to cause the opposing signals to be maintained at stop in the rear of a train proceeding through a stretch of single track until such stretch of track has become entirely unoccupied in the rear of the train. This is in accordance with the desired mode of operation for most absolute-permissive-block signaling systems.

Other objects, purposes and characteristic features of the present invention will be in part obvious from the accompanying drawings and in part pointed out as the description of the invention progresses.

In describing the present invention is detail, reference will be made to the accompanying drawings in which corresponding reference characters are used to designate corresponding parts throughout the various figures, in which like letter reference characters are used to designate parts having similar features and functions, such parts being generally made distinctive by reason of preceding numerals indicative of the particular location of devices with which such parts are associated or by use of exponents, and in which:

Figs. 1A through 1P show diagrammatically the distinctive track circuit codes employed and the direction of code transmission in various track sections of this embodiment of the present invention under various conditions of traffic; and Figs. 2A through 2E, when placed side by side, illustrate the circuits provided for governing traffic through a typical stretch of single track extending between sidings, and through a typical siding section.

Rather than attempting to show the specific construction of parts employed and their arrangement, the various illustrations are provided to facilitate the disclosure of the present invention as to its mode of operation. Thus, conventional symbols are employed for relays and other devices, and symbols are employed for indicating the connections to the terminals of batteries or other sources of energy instead of illustrating in detail the direct connection of each circuit to any particular battery or other source of energy supply.

The symbols (+) and (—) are employed to indicate the connection to the respective positive and negative terminals of suitable batteries or other sources of direct current, and the circuits with which those symbols are used always have current flowing in the same direction. If alternating current is used, the symbols (+) and (—) are to be understood as being indicative of relative instantaneous polarities.

To simplify the description of the present invention, reference is made to the function of various types of apparatus from time to time by use only of the letter reference characters common to such similar parts or devices. It is to be understood that such a reference applies to any parts designated in the drawings by reference characters that are similar except for preceding numerals or for exponents associated therewith.

With reference to Fig. 1A, the trackway of this embodiment of the present invention comprises a main stretch of single track having connected thereto by track switches passing sidings 23, 24, 25 and 26 spaced short distances apart. Although in this embodiment of the present invention three blocks are included between each of the sidings, it is to be understood that a greater number of blocks can be provided, or only two blocks can be provided between sidings, in accordance with the requirements of practice. It is believed that it will be readily apparent to those skilled in the art, from the description of this embodiment of the present invention, how the system is readily applicable to systems having a different number of blocks between sidings, and a different arrangement of the signals.

It is believed to be readily apparent that the circuits required for the control of signals associated with the single stretches of track between the various sidings are similar, and therefore, for simplification of the present disclosure, the circuits are illustrated in Figs. 2A through 2E only for the stretch of single track included between the passing sidings 24 and 25, and for the signals associated with the siding 24. It is to be understood that these circuits are typical of the circuits which are provided for the similar track portions of the trackway illustrated in Fig. 1A, and the specific description of the mode of operation of the system will be directed to the mode of operation of these typical circuits.

With reference to Figs. 2A through 2E, it will be noted that the circuits are illustrated in detail for a portion of the trackway which is shown in Fig. 1A, such portion including track sections 7T, 8-9T, 10T, 11-12T, 13T and 14-15T.

Although different types of siding arrangements can be provided, the sidings of this embodiment of the present invention are of the usual type having track circuit protection only for the fouling of the track switches for connecting the various sidings to the main stretch of track. The track switches are provided with the usual type of switch circuit controllers.

The signals for governing traffic in both directions along the trackway are located in a manner commonly employed for the location of signals in absolute-permissive-block signaling systems, there being entering and leaving signals for the head block at each end of each of the sidings. For purpose of description of the present invention, the head block signals are called entering and leaving signals with respect to the siding with which they are associated. Thus, for example, the signals 8 and 9 are entering signals for the siding section 8-9T for respective east and west directions of traffic, and signals 7 and 10 are leaving signals for the siding section 8-9T governing respectively west and east bound traffic. In a similar manner the signals 13 and 14 are respectively leaving and entering signals for the siding 25. The signals 7, 10 and 14 of course are absolute signals, while the signals 8 and 9 are permissive signals in accordance with the usual practice. Signals 11 and 12 are respectively west and east bound staggered intermediate signals. According to the system provided by the present invention the block between these signals can be of a length, either greater or less than braking distance for the trains.

The symbols used for the various signals along the trackway in the illustrations are to be understood as being indicative of the signal aspects displayed under various traffic conditions rather than being indicative of the particular character of the signals employed. It is to be understood that various types of signals can be employed in the system as provided by the present invention such, for example, as semaphore signals, search light signals, color light signals having individual color lamp units, and position light signals. For this embodiment of the present invention, however, signals of the search light type are employed, such, for example, as the type of signal shown in the patent to O. S. Field, Patent No. 1,835,150, dated December 8, 1931. Each signal provides the usual green indication for clear, yellow indication for caution, and red indication for danger, or stop.

Each of the blocks in this embodiment of the present invention has a coded track circuit having a code transmitter and a code receiver at each end thereof. The code transmitter at each end causes the application of impulses to the track circuit at that end of the pulsing of a code repeater relay CP. A code following track relay TR at each end of each of the track circuits is operable to follow the code of the track circuit with which it is associated to receive each impulse impressed on that track circuit at the opposite end of that track section.

Each code repeater relay CP can be operated when rendered effective for the transmission of a driven code, and the relays CP for the right-hand ends of the various track sections are adapted for selectively transmitting an inverse code. The code transmitter relays CP and the code following track relays TR are preferably of a type having a polar structure arranged so as to cause the armature of the relay to be picked up only when the relay is energized by a particular polarity. Such polar characteristics of the relays CP and TR are indicated in the illustrations by the use of arrows in the symbols for the relay windings. The polar characteristics of the relays CP are primarily essential where such relays are used for the transmission of inverse codes because of the desirability of having such relays pick up for the transmission of such codes only when the flux collapses after a given polarity of energization in the decoding transformers from which the relays CP are respectively actuated.

When a relay CP is active for the transmission of a driven code, it repeats the impulses produced by a pulsing device actuated at a constant rate to provide "off" and "on" periods of relatively equal lengths. Such pulsing device can be of the oscillatory type, for example, such as disclosed in the patent to P. N. Bossart, Patent No. 1,858,876, dated May 17, 1932. If oscillators of this character are used, an oscillator is provided at each signal location for each of the different code rates which can be transmitted therefrom in either direction. The code rates employed in this embodiment of the present invention are rates commonly used in coded track circuit systems, the code rates having been selected because of such rates being most distinctive from extraneous sources of energy, frequency harmonics and the like. The code rates employed are respectively 180 impulses per minute, 120 impulses per minute, and 75 impulses per minute. In order to simplify the illustrations, only contacts of the code oscillators have been shown, each contact having the reference character for its code oscillator located directly above it. Such reference character bears a preceding numeral indicative of the code rate of that oscillator. It is of course to be understood that other impulse producing means such, for example, as motor driven codes can be employed.

The pulsing of a code following track relay TR upon the reception of a track circuit code causes the pulsing of a contact governing energization of a decoding transformer TF, and the alternating current produced in that manner in the secondary winding of such decoding transformer causes the energization of a direct current relay H through the medium of a rectifying contact of the track relay TR associated with the code receiver for that end of the track circuit. Each of the relays H is sufficiently slow acting to cause it to be maintained picked up by the pulsating direct current employed for its energization.

Certain of the primary windings of the decoding transformers also have connected thereto one or more tuned circuits for the energization of a distant control relay D. Each of such relays D responds only to the reception of a particular code, and each relay D is of the usual direct current neutral relay type energized from the secondary winding of its decoding transformer through the medium of a full-wave rectifier.

A stick relay S is provided for each of the intermediate signal locations in acordance with the usual practice in absolute-permissive-block signaling systems, certain of such stick relays S having associated therewith, an approach relay AR connected in series in one of the track circuits to govern the energization of that stick relay in accordance with the passage of a train in a particular direction. A stick relay S is also provided at each end of each of the passing sidings for selecting certain codes for transmission under certain traffic conditions.

Having described the general organization of the system, it is believed that a more complete understanding of the system can be had from reference to typical operating conditions under various conditions of traffic.

Operation

*General.*—Before considering the specific circuits involved, it is believed expedient to consider the general mode of operation of the system as diagrammatically illustrated in Figs. 1A through 1P. After having considered such general mode of operation, detail description will be set forth as to the specific circuits involved under various typical traffic conditions.

In Figs. 1A through 1P, the arrows formed by solid lines indicate the direction of driven code transmission, and the arrows formed by broken lines indicate the direction of transmission of inverse codes. The numeral directly above each of the solid arrows indicates the code rate being transmitted through that particular track section.

With reference to Fig. 1A, the normal conditions of the system as to the conditions of the signals, and the direction of code transmission through the various track circuits are illustrated. It will be noted in Fig. 1A that driven code transmission is normally effective through each track section in a direction transmitted from left to right, and an inverse code is normally transmitted through each of the track sections from right to left. The driven codes therefore normally govern signals for west bound traffic, and inverse codes normally govern signals for east bound traffic. Inasmuch as certain of the tuned circuits for governing the clear indications of the various signals are common to both directions of traffic, such tuned circuits are normally effective for causing the clearing of west bound signals only. Thus, each of the west bound signals is cleared by the energization of a D relay through the medium of a tuned circuit. Certain of such D relays are used for signals for the opposite direction of traffic when an east bound train is sufficiently in approach of such locations as to cause the opposing signals for west bound traffic to be put to stop. It is for this reason that the east bound signals 6, 8, 12, 14, 18 and 20 are normally at stop. A train immediately in approach of any one of these signals of course causes the opposing signals for that stretch of single track to be put to stop, and the putting to stop of such signals makes available the tuned circuits for the D relays for use in clearing the east bound signals.

Only inverse codes are used for clearing the east bound leaving signals. Furthermore, east bound signals are cleared only if the code rate is 75 impulses per minute. This accounts for such signals being normally at caution, the code rate being normally at 180 impulses per minute.

Figs. 1B through 1E inclusive illustrate the codes transmitted under various traffic conditions upon the passage of east bound and west bound trains respectively from one siding to the next siding. These diagrams have been arranged in such a manner as to illustrate in each figure the conditions of the signals and the conditions of code transmission for each direction of traffic for a particular step in the progress of a train from one siding to the next.

Figure 1B:
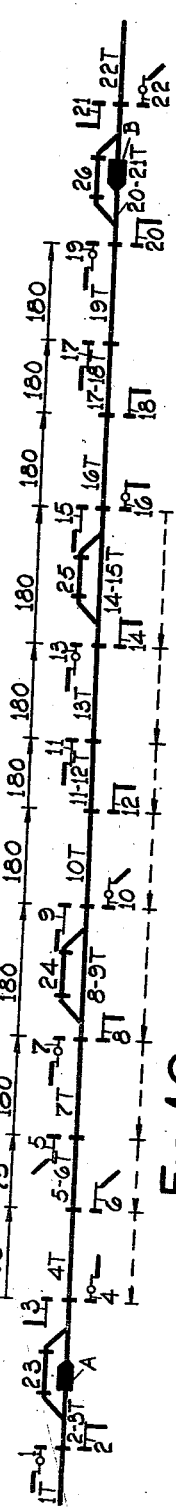

With reference to Fig. 1B, it will be noted that the presence of the east bound train A in the siding track section 2-3T causes a 75 code to be transmitted through each of the track sections 4T and 5-6T for the caution indication of signal 5. The reception of the 75 code at the right-hand end of track section 5-6T causes the transmission of a 180 code through the track section 7T for the clear indication of signal 7. If the train A were proceeding in the opposite direction, a 120 code would be transmitted through the track sections 4T and 5-6T for the caution indication of signal 5, and the reception of the 120 code at the right-hand end of track section 5-6T in combination with the energized condition of the directional stick relay for signal 5 would cause the transmission of a 180 code for the clearing of signal 7. It will be noted that only the codes have been changed through the stretch of single track in advance of the train A, the direction of driven code transmission being maintained the same as under normal conditions.

The signal 4, which is normally at caution as shown in Fig. 1A, is changed from caution to clear when the inverse code for the control changes to a 75 code. This is because the D relay for such leaving signal is picked up only responsive to the reception at that signal of a 75 code for its control. Thus an east bound leaving signal is cleared dependent upon the approach of a train to such signal, the approach of a train being necessary to select a 75 driven code for transmission in a direction away from the signal.

When the trackway is unoccupied for some distance in advance of the west bound train B, the entrance of such train into the siding track section 20-21T as shown in Fig. 1B removes the inverse codes transmitted under normal conditions through the section of single track between the passing sidings 25 and 26. The removal of the inverse code transmitted for the control of signal 18 of course causes that signal to be put to stop, and similarly the removal of the inverse code transmitted for the control of signal 16 causes that signal to be put to stop. This condition, however, is effective only when there is no opposing train present in the vicinity of siding 25. The presence of an opposing train in track section 14-15T, for example, would cause the signals 16 and 18 to display caution indications in a manner to be hereinafter considered with more specific reference to Figs. 1F through 1H.

Figure 1C:
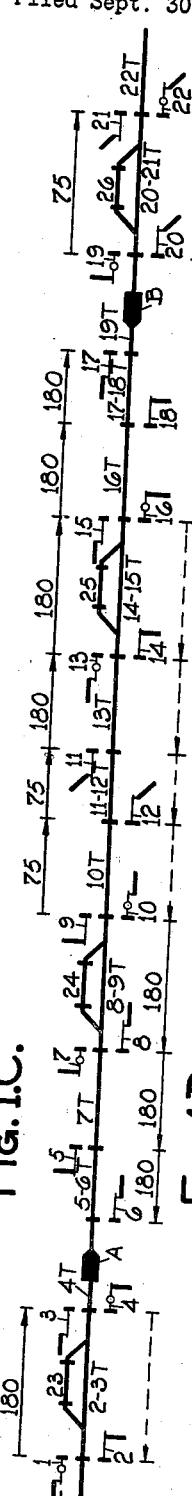

With reference to Fig. 1C, it is assumed that the respective east and west bound trains A and B have left the respective siding sections which they were assumed to occupy in the conditions considered in Fig. 1B. Under such conditions the entrance of the train A into the track section 4T causes the removal of the driven code transmitted through the track sections 4T, 5-6T, 7T and 8-9T, and the removal of the codes from these sections causes a reversal in the direction of driven code transmission for the sections 5-6T, 7T and 8-9T. The reversal of the direction of driven code transmission in the track section 8-9T is effective to cause the signal 8 to be cleared upon the reception of a 180 driven code. The signal 6 is caused to be cleared in accordance with the transmission of a 180 driven code from right to left through the track sections 7T and 5-6T. It will therefore be obvious that the entrance of an east bound train into the single track section between two sidings causes a reversal in the direction of driven code transmission for the unoccupied track sections throughout such stretch of single track and for the next siding section.

The removal of the driven code formerly transmitted through the track section 8-9T for the clearing of signal 9 of course causes the code rates to be changed for the track sections 10T and 11-12T to correspond with the similar condition illustrated in Fig. 1B where the signal 3 has been put to stop by the presence of the train A in the siding section 2-3T.

It will be noted that the entrance of the train B into track section 19T in the single track section between passing sidings 25 and 26 has no effect upon the codes transmitted in advance of the train, but the passage of a train past the leaving signal 19 provides for the transmission of a 75 driven code from left to right through the track section 20-21T for the caution indication of the signal 21.

Figure 1D:
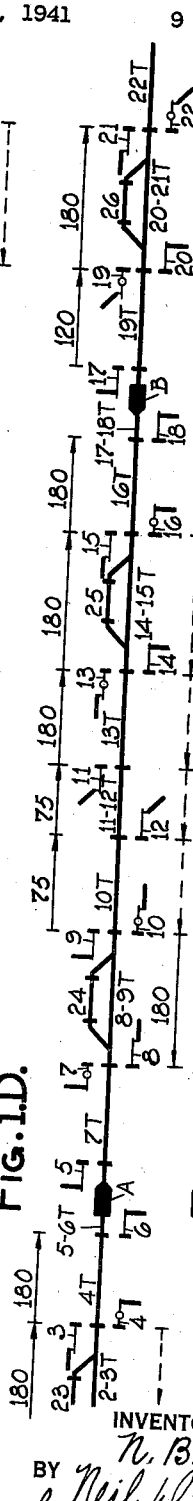

With reference to Fig. 1D it will be noted that the advance of the trains A and B respectively into the next track section effects no change in the codes transmitted in advance of the trains. Inasmuch as there is no train assumed to be following train A, the normal conditions of the system are partially restored in the rear of the train, but complete restoration is delayed until after the stretch of single track has become completely unoccupied. If a following train were to approach signal 4 when the train A occupies track section 5-6T, the code rate transmitted through the track section 4T would be at a 120 rate in accordance with the picking up at signal 4 of a special stick relay. The reception of the 120 code rate at the right-hand end of track section 4T would cause an inverse code to be transmitted for the caution indication of signal 4. A 120 driven code is transmitted in the rear of train B for the caution indication of signal 19, and for causing the transmission of a 180 driven code through the siding section 20-21T for the clearing of signal 21.

Figure 1E:
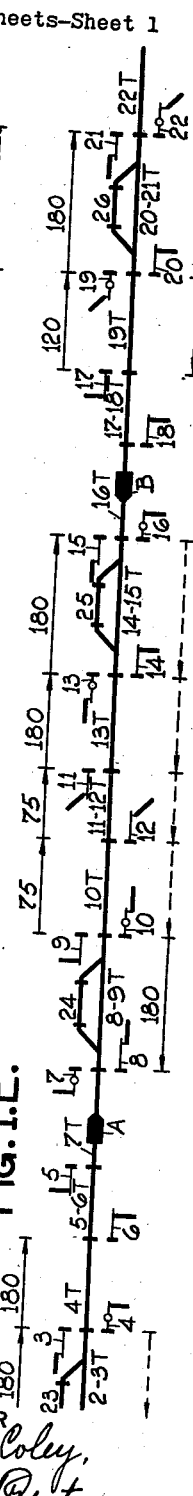

When the east and west bound trains A and B advance to the track sections 7T and 16T respectively as shown in Fig. 1E, the codes transmitted for the portion of the trackway between the two opposing trains are unaffected from the condition illustrated in Fig. 1D. The advance of the train A into the track section 7T does not allow the conditions of code transmission to be restored immediately in the rear of the train as it is desirable in accordance with well known principles of absolute-permissive-block signaling systems to cause each signal governing opposing traffic in the rear of a train in a single track section, such as the signal 5, to be maintained at stop until the train has left the entire single track section. This desired mode of operation of course is in connection with the use of stick relays for the intermediate signals for selecting the controls for signals governing following train movements. A similar condition exists with respect to the passage into track section 16T of the train B.

It has been broadly stated that, where short stretches of single track are involved between passing sidings, it is desirable to provide extended controls which are effectively overlap controls for the head block signals governing passage to such stretch of single track. The conditions under which such type of controls are provided in the present system are illustrated in Figs. 1F through 1H. In these figures, it is provided that the leaving signal at one siding displays a caution indication if the track section at the next siding is occupied by an opposing train. This condition is true for either direction of traffic. Therefore, in case of simultaneous entry of opposing trains to a stretch of single track between sidings, as to the stretch of single track between sidings 24 and 25, each train will encounter a caution signal upon leaving its respective siding section. Such caution signal of course warns the trainmen that they must be prepared to stop short of the first intermediate signal. Such being the case, it is safe that a track section shorter than braking distance be provided between opposing staggered intermediate signals, and it is even safe that only one double intermediate signal location be provided for the stretch of single track between the sidings.

Upon comparing Figs. 1E and 1F, it will be noted that the advance of train A into the track section 8–9T causes no change in the status of the codes transmitted and the signal indications provided for the track sections included between the opposing trains A and B. Thus, the leaving signals 10 and 13 are both maintained clear under such conditions. This condition is safe because there can obviously be no chance of simultaneous entry of the trains A and B into the stretch of single track between the sidings 24 and 25 unless the trains A and B both occupy siding sections 8–9T and 14–15T respectively at the same time.

When the track sections 8–9T and 14–15T do become occupied at the same time by opposing east and west bound trains respectively, a condition is set up where there may be a possibility of the simultaneous entry of the trains into the stretch of single track between the sidings 24 and 25. For the purpose of explanation, with reference to Fig. 1G, it will be assumed that the train B enters the siding section 14–15T subsequent to the entrance to the section 8–9T of the east bound train A, although it is to be understood that the opposite sequence would provide the same general mode of operation of the system. The entrance of the train B into the track section 14–15T causes a tumble-down of the inverse codes for each of the relays H for signals 10, 12 and 14. The dropping away of relay 10H closes a pick-up circuit for the stick relay 10S, and the picking up of relay 10S changes the driven code in the track section 10T from a 75 to a 120 code as illustrated in Fig. 1H. The reception at the right-hand end of section 10T of such 120 code causes the transmission of a 120 driven code through the track section 11–12T. The reception at the right-hand end of track section 11–12T of a 120 driven code causes the signal 11 to display a caution indication and also causes a 120 driven code to be transmitted through the track section 13T. The reception at the right-hand end of track section 13T of a 120 driven code causes the signal 13 to display a caution indication. Upon comparing Figs. 1H and 1F, it will be noted that the 120 code transmitted through the track section 13T is selected because of the shifting of the code rate for the track section 11–12T from a 75 code to a 120 code.

Upon reception at the right-hand end of track section 13T of a 120 driven code, a D relay tuned to the 120 rate is picked up, and the picking up of such relay initiates the transmission of an inverse code through the track section 13T. Upon reception of the inverse code at the left-hand end of track section 13T, an inverse code is caused to be transmitted through the track section 11–12T to cause the signal 12 to be maintained at caution. The energized condition of the H relay at the left-hand end of track section 11–12T allows the transmission of an inverse code through the track section 10T for the control of signal 10. The reception of such inverse code at the left-hand end of track section 10T causes the signal 10 to display a caution indication as compared to the clear indication displayed by such signal under the conditions illustrated in Fig. 1F. This is because the code through the track section 10T has been changed from a 75 code to a 120 code, the D relay for signal 10 being tuned only to the 75 code.

It will be noted in Fig. 1G which illustrates the momentary tumble-down condition for the energization of the stick relay 10S, that the signals have been assumed to be sufficiently slow acting as not to follow the momentary interruption in code transmission. Although this is the desired mode of operation it is to be understood that quicker acting signals could be used and other circuit means provided to prevent the flashing of the signals, or the signals could be allowed to flash red momentarily if such is not objectionable in practice.

The Figs. 1I through 1L illustrate the codes employed and the direction of code transmission under various traffic conditions associated with the meeting of trains at the siding 24. It is believed to be readily apparent that the mode of operation under such conditions corresponds to considerable extent with the general mode of operation which has been considered with respect to the passage of east and west bound trains individually, and with respect to the mode of operation associated with the use of the special stick relay 10S for the leaving signal 10.

Figs. 1M through 1P illustrate certain typical traffic conditions in which following trains are involved. It will be apparent that the code rates employed and the direction of code transmission under such conditions are in accordance with the general mode of operation of the system as heretofore considered under various other conditions of traffic.

*Normal conditions.*—The normal conditions as illustrated diagrammatically in Fig. 1A and as illustrated in detail in Figs. 2A through 2E are those conditions which exist when the trackway is unoccupied by trains, and it is to these conditions that the system is restored after passage of a train in either direction, provided there are no other trains present to prevent such restoration.

Normally the code transmitter at the left-hand end of each of the track sections is active for the transmission of a 180 driven code, and the reception of such code at the right-hand end of the track section causes the picking up of a relay H and a relay D. As a typical example of how such H and D relays are normally energized, detailed consideration will be given, for example, to the track circuit for the track section 8–9T in which a 180 driven code is normally transmitted from left to right, and in which an inverse code is normally transmitted from right to left.

The pulsing of the track circuit for the transmission of a 180 driven code is effected by the code repeater relay 8CP (see Fig. 2A) which follows the impulses produced by the code oscillator 180CT. The relay 8CP is picked up for each impulse of the oscillator 180CT by the energization of a circuit closed from (+), including contact 30 of oscillator 180CT, front contact 31 of relay 7H, and winding of relay 8CP, to (—). Each time the relay 8CP is picked up, a track circuit is closed to cause the picking up of the code following track relay 9TR at the right-hand end of track section 8–9T. Relay 9TR is picked up for each impulse upon the energization of a circuit closed from the positive terminal of track battery 32 including front contact 33 of relay 8CP, upper rail of track section 8–9T, back contact 34 (see Fig. 2B) of relay 9CP, winding of relay 9TR, lower rail of track section 8–9T, and the winding of the approach relay 7AR (see Fig. 2A) to the negative terminal of the track battery 32. The approach relay 7AR is marginal in that it is normally inactive, and becomes active only when the track section 8–9T is shunted as by the presence of a train.

The pulsing of contact 35 of the track relay 9TR causes the primary winding of the decoding transformer to be energized with first one polarity and then the other. When the front contact 35 is closed the upper half of the primary winding of the transformer is energized by a circuit closed from (+), including front contact 35 of relay 9TR, the upper terminal of the primary winding of transformer 9TF, and the center terminal of such primary winding, to (—). When back contact 35 is closed the lower half of the primary winding of the transformer is energized by a circuit closed from (+), including back contact 35 of relay 9TR, the lower terminal of the primary winding of transformer 9TF, and the center terminal of such primary winding, to (—).

The contact 37 of relay 9TR serves as a rectifying contact to alternately connect the respective upper and lower portions of the secondary winding 36 of the transformer 9TF to the direct current relay 9H. When front contact 37 of relay 9TR is closed, a circuit for relay 9H is closed extending from the lower terminal of winding 36 including front contact 37 of relay 9TR, and winding of relay 9H to the center terminal of winding 36; and when back contact 37 of relay 9TR is closed, a circuit for relay 9H is closed extending from the upper terminal of winding 36 including back contact 37 of relay 9TR, and winding of relay 9H to the center terminal of winding 36.

The reversal of flux in the decoding transformer 9TF upon the reception of a code transmitted through the track section 8–9T is also effective to cause the energization of the decoding transformer 38 included in the tuned circuit for the control of the relay 9D. The circuit is so tuned that sufficient current will flow from the secondary winding of the transformer 38 through the full-wave rectifier 39 to the direct current relay 9D to cause such relay to be picked up, only when the code received is at a 180 rate. The primary winding of transformer 38 is connected across the primary winding of transformer 9TF by a circuit extending from the upper terminal of the primary winding of transformer 9TF including condenser 90 and the primary winding of the transformer 38 to the lower terminal of the primary winding of transformer 9TF.

Each time the contact 35 of relay 9TR shifts from a picked up to a dropped away position, the induced voltage in the secondary winding 40 of the decoding transformer 9TF causes the picking up of the code transmitter relay 9CP for transmission of an impulse of an inverse code. The lower winding of the relay 9CP is connected directly to the secondary winding 40 of the transformer 9TF in an obvious manner, and, as has been heretofore pointed out, the relay 9CP is of such a polar structure as to cause that relay to be picked up only when the voltage induced in the winding 40 of the transformer 9TF is of a particular polarity. Such polarity is that provided by the shifting of the contact 35 from its picked up to its dropped away position. Thus the picking up of the relay 9TR is ineffective to cause the picking up of the code transmitter relay 9CP.

It will therefore be apparent that the dropping away of the relay 9TR at the end of an "on" period of a driven code received at the right-hand end of track section 8–9T causes the picking up of the relay 9CP for the transmission of an impulse of an inverse code. The track circuit for track section 8–9T is energized for each impulse of the inverse code by a circuit closed from the positive terminal of track battery 41 including front contact 34 of relay 9CP, upper rail of track section 8–9T, back contact 33 (see Fig. 2A) of relay 8CP, winding of track relay 8TR, and lower rail of track section 8–9T, to the negative terminal of track battery 41 (see Fig. 2B).

At the left-hand end of track section 8–9T the track relay 8TR (see Fig. 2A) follows the impulses of the inverse code received, and the pulsing of contact 42 of such relay causes the relay 8H to be normally picked up, such relay being picked up by the energization of circuits similar to those described more specifically with reference to the control of the relay 9H at the right-hand end of track section 8–9T. Inasmuch as the relay 7–8D for the head block signal location at the right-hand end of the siding 24 is used for both directions of traffic, such relay is normally energized in accordance with the reception of a 180 driven code transmitted through the track section 7T, and therefore that relay is associated with the clear indication of signal 7 under normal conditions rather than being associated with the clear indication of signal 8.

The signal 7 is therefore normally energized with a polarity to cause such signal to be cleared by the closure of a circuit extending from (+), including front contact 91 of relay 7–8D, front contact 92 of relay 7H, winding of signal 7, front contact 93 of relay 7H, and front contact 94 of relay 7–8D, to (—).

The entering signal 8, however, at the left-hand end of the siding is normally at danger because the D relay for that head block location is used in clearing the west bound signal 7. Thus, the circuit for the winding of signal 8 is opened under normal conditions at back contact 47 of relay 7H.

The picked up condition of the relays 9D and 9H (see Fig. 2B) at the right-hand end of track section 8–9T closes a circuit for the energization of signal 9 with a polarity to cause such signal to display a green clear indication. The signal winding is energized under such conditions by a circuit closed from (+), including front contact 43 of relay 9D, front contact 44 of relay 9H, winding of signal 9, front contact 45 of relay 9H, and front contact 46 of relay 9D, to (—).

Code transmission is normally effective through the track section 10T by the energization of circuits corresponding to those described in detail for the track circuit of track section 8–9T, a 180 driven code being normally transmitted from left to right, and an inverse code being normally transmitted from right to left. The relay 10CP for transmitting the 180 driven code is picked up during each impulse of the oscillator 180CT¹ by the energization of a circuit extending from (+), including contact 48 of oscillator 180CT¹, front contact 49 of relay 9H, and winding of relay 10CP, to (—).

The pulsing of contact 50 in the track circuit for the track section 10T causes the corresponding pulsing of the contact 51 (see Fig. 2C) of the code following track relay 10TR¹ at the right-hand end of that track section. The relay 10H¹ is normally picked up in accordance with the pulsing of contact 51 of the relay 10TR¹ through the medium of the decoding transformer 10TF¹ in a manner corresponding to that described in detail for the energization of the relay 9H at the right-hand end of track section 8–9T.

The relay 10–12D is also picked up under normal conditions because the code received is at a 180 rate, and because of the energized condition of the relay 10H¹, the relay 10H¹ being effective to select whether the relay 10–12D is to be connected across the primary winding of the decoding transformer 10TF¹ or across the primary winding of the decoding transformer 12TF. Thus, the tuned circuit for the transformer associated with the control of the relay 10–12D is normally closed from the upper terminal of the primary winding of relay 10TF¹ including front contact 52 of relay 10H¹, primary winding of transformer 53, condenser 54, and front contact 55 of relay 10H¹, to the lower terminal of the primary winding of the decoding transformer 10TF¹. If the relay 10H¹ were dropped away, the closure of back contacts 52 and 55 would connect the relay 10–12D across the primary winding of transformer 12TF in an obvious manner.

The picked up condition of the relays 10H¹ and 10–12D conditions a circuit by which the code transmitter relay 12CP is energized during each impulse of the code oscillator 180CT², such circuit being closed from (+), including contact 56 of oscillator 180CT², front contact 57 of relay 10–12D, back contact 58 of relay 12S, front contact 59 of relay 10H¹, and winding of relay 12CP, to (—). The pulsing of contact 60 of relay 12CP at a 180 rate causes the transmission from left to right through the track section 11–12T of a 180 driven code.

At the right-hand end of track section 11–12T the relay 11TR (see Fig. 2D) follows the 180 code, and the pulsing of contact 61 of such relay causes the relays 11H and 11–13D to be picked up under conditions similar to those described for the energization of the relays 10H¹ and 10–12D, the relay 11–13D being picked up because of the 180 rate of the code being received.

The energized condition of the relays 11H and 11–13D causes a clear signal to be displayed by the signal 11 upon the energization of its winding by a circuit closed from (+), including front contact 66 of relay 11–13D, front contact 67 of relay 11H, winding of signal 11, front contact 68 of relay 11H, and front contact 69 of relay 11–13D, to (—).

The picked up condition of the relays 11H and 11–13D causes the code transmitter relay 13CP¹ to be active for the transmission of a 180 driven code because of a circuit closed during each impulse of the code oscillator 180CT³ extending from (+), including contact 62 of oscillator 180CT³, back contact 63 of relay 11–13D¹, front contact 64 of relay 11H, and winding of relay 13CP¹, to (—). The relay 11–13D¹ is dropped away under normal conditions because its circuit is tuned to a 120 rather than a 180 rate. The pulsing of contact 65 of relay 13CP¹ in the track circuit for track section 13T causes the transmission of a 180 driven code from left to right through such track section.

At the right-hand end of track section 13T the relay 13TR (see Fig. 2E) follows the 180 driven code, and the pulsing of contact 70 of that relay causes the relays 13H and 13–14D to be picked up by the energization of circuits similar to those which have been described more in detail for the energization of the relays 10H¹ and 10–12D.

The signal 13 is normally clear in accordance with the picked up condition of the relays 13H and 13–14D upon the energization of a circuit for the winding of signal 13 closed from (+), including front contact 71 of relay 13–14D, front contact 72 of relay 13H, winding of signal 13, front contact 73 of relay 13H, and front contact 74 of relay 13–14D, to (—).

The transmission of a 180 driven code from left to right through the track section 14–15T is effective in a manner corresponding to the similar condition which has been described for the transmission of a 180 driven code at the left-hand end of track section 8–9T, and the communication of an inverse code back through the track section 14–15T is also effective to cause the picking up of the relay 14H in a manner similar to the condition which has been described for the transmission of an inverse code through the track section 8–9T for the energization of the relay 8H.

In accordance with the energized condition of the relay 14H, the relay 13CP is normally active for the transmission of an inverse code through the track section 13T for the energization of relay 13H¹. The relay 13CP is picked up each time the contact 70 of relay 13TR shifts to its lower position. The relay 13CP is picked up under such conditions because of the energization of a circuit closed from the upper terminal of the secondary winding 127 of the decoding transformer 13TF including front contact 76 of relay 14H, and lower winding of relay 13CP to the lower terminal of the secondary winding 127 of transformer 13TF.

The reception of the inverse code at the left-hand end of track section 13T causes the pulsing of contact 77 (see Fig. 2D) to provide for the energization of the relay 13H¹, and the picked up condition of relay 13H¹ causes the relay 11CP to be active for the transmission of an inverse code through the track section 11–12T by the closure of an obvious circuit including secondary winding 78 of the decoding transformer 11TF and including front contact 79 of relay 13H¹.

At the left-hand end of track section 11–12T, the reception of an inverse code causes the relay 12H (see Fig. 2C) to be picked up by the pulsing of contact 80 of relay 12TR. The signal 12 is normally at stop, however, because the relay 10–12D is normally effective to receive a code for the opposite direction of traffic. Therefore, the winding of signal 12 is normally deenergized in accordance with its circuit being open at back contact 81 of relay 10H¹.

The relay 10CP¹ is active for the transmission of an inverse code through the track section 10T under normal conditions in accordance with the picked up condition of the relay 12H. The relay 10CP¹ picks up each time the contact 51 of relay 10TR¹ shifts to its lower position by the energization of an obvious circuit for the lower winding of such relay including the secondary winding 82 of the decoding transformer 10TF¹ and front contact 83 of the relay 12H.

At the left-hand end of track section 10T, the relay 10TR (see Fig. 2B) follows the inverse code transmitted from right to left through the track section 10T, and the pulsing of contact 84 of that relay causes the relay 10H to be picked up. Inasmuch as relay 10D has a circuit tuned to a 75 code rate, the signal 10 is normally at caution because of the energized condition of the relay 10H and the deenergized condition of the relay 10D. The winding of signal 10 is energized with a polarity to cause such signal to display a caution indication by a circuit extending from (+), including back contact 85 of relay 10D, front contact 86 of relay 10H, winding of signal 10, front contact 87 of relay 10H, and back contact 88 of relay 10D, to (−).

The leaving signal 7 (see Fig. 2A) at the left-hand end of the siding 24 is normally clear in accordance with the picked up condition of the relays 7H and 7–8D. The relays 7H and 7–8D are picked up because of the pulsing of contact 98 of the code following track relay 7TR in a manner corresponding to that described in detail for the energization of the relays 10H¹ and 10–12D for the right-hand end of track section 10T, the relay 7–8D being normally energized because of its circuit being tuned to receive the 180 driven code transmitted from left to right through the track section 7T. The clearing of signal 7 is effective in a manner corresponding to that described for the clearing of the leaving signal 13 at the left-hand end of the passing siding 25. Signal 8 is normally at stop because its circuit is open at back contact 47 of the relay 7H.

*Passage of an east bound train.*—In considering in detail the manner in which the circuits are affected by the passage of an east bound train, reference will be made particularly to the conditions affecting the circuits illustrated in Figs. 2A through 2E, and it is to be understood that the mode of operation as described with reference to these drawings is typical of the mode of operation for similar track portions under similar conditions for which the circuits have not been illustrated in detail. In Fig. 1B the presence of the east bound train A in the siding track section 2–3T has no effect upon the 180 driven code transmitted from left to right through the track section 7T for the clear indication of signal 7, but the entrance of the train A into the stretch of single track between the sidings 23 and 24 as illustrated in Fig. 1C causes the 180 driven code normally transmitted for the control of signal 7 to be removed, and the signal 7 thus is put to stop. Such mode of operation is in accordance with the usual absolute-permissive-block tumble-down system, and the manner in which the code for the control of signal 7 is removed will be more apparent as the description progresses and a similar condition is described in detail with reference to the tumble-down provided for causing the leaving signal 13 at the left-hand end of siding 25 to be put to stop when the east bound train A progresses past the leaving signal 10 at the left-hand end of the stretch of single track between the sidings 24 and 25. Thus, for the present, it will be assumed that the east bound train A has entered the track section 4T as illustrated in Fig. 1C and the entrance of that train into such track section has caused the removal of the 180 driven code formerly transmitted from left to right through the track section 7T.

With reference to Fig. 2A, the removal of the 180 driven code which is normally transmitted from left to right through the track section 7T causes the code following track relay 7TR to become inactive, and the relay 7H is dropped away due to the inactivity of the contact 98 of relay 7TR.

Upon the dropping away of relay 7H, the circuit by which the code transmitter relay 8CP has been active for the transmission of a driven code from left to right through the track section 8–9T is opened at front contact 31, thus rendering the code transmitter at the left-hand end of track section 8–9T inactive for the transmission of a driven code. In accordance with the inactivity of such transmitter, the code following track relay 9TR (see Fig. 2B) at the right-hand end of track section 8–9T of course becomes inactive, and the inactivity of the contact 35 of such relay causes the relays 9H and 9D to be dropped away.

The removal of the driven code normally transmitted from left to right through the track sections 7T and 8–9T is thus effective to cause the signals 7 and 9 respectively to display stop indications. The winding of signal 7 is deenergized by the opening of its circuit at front contacts 92 and 93 of relay 7H, and the winding of signal 9 is deenergized by the opening of its circuit at front contacts 44 and 45 of relay 9H.

The dropping away of the relay 9H at the right-hand end of track section 8–9T closes a circuit to render the code transmitter relay 9CP for the right-hand end of track section 8–9T active for the transmission of a 180 driven code because of the energization of the upper winding of such relay for each impulse produced by the oscillator 180CT¹. The upper winding of relay 9CP is energized during each of such impulses by a circuit closed from (+), including contact 103 of oscillator 180CT¹, front contact 104 of relay 10H, winding of relay 9CP, and back contact 105 of relay 9H, to (−).

The reception of the 180 driven code at the left-hand end of track section 8–9T causes the pulsing of the contact 42 (see Fig. 2A) of the code following track relay 8TR, and the pulsing of that contact provides for the energization of the relay 8H. The relay 7–8D is now picked up by the energization of its tuned circuit from the decoding transformer 8TF because of the connection of such circuit to the primary winding of transformer 8TF by back contacts 106 and 107 of the relay 7H which has been dropped away upon the removal of the driven code transmitted from left to right through the track section 7T.

The conditions are now established to effect the clearing of the entering signal 8 for governing passage of the east bound train, such signal being cleared in accordance with the energization of its winding by a circuit closed from (+), including back contact 47 of relay 7H, front contact 108 of relay 7–8D, front contact 109 of relay 8H, winding of signal 8, front contact 110 of relay 8H, and front contact 111 of relay 7–8D, to (−).

In accordance with the picked up condition of the relay 8H for the left-hand end of track section 8–9T and the dropped away condition of the relay 7H for the right-hand end of track section 7T, the code transmitter relay 7CP becomes active to transmit a 180 driven code from right to left through the track section 7T. The upper winding of that relay is energized during each impulse of the code oscillator 180CT by a circuit extending from (+), including contact 122 of oscillator 180CT, front contact 112 of relay 7–8D, front contact 113 of relay 8H, upper winding of relay 7CP, and back contact 114 of relay 7H, to (−). The pulsing of contact 115 of the relay 7CP provides for the transmission of the 180 driven code from right to left through the track section 7T for the clearing of the intermediate signal 6 (see Fig. 1C). The circuits for causing the clearing of signal 6 obviously correspond to the circuits provided for the clearing of signal 12 which will be hereinafter considered as the train A is assumed to progress along the trackway.

It will be noted with reference to Fig. 1C that the removal of the driven code formerly transmitted through the track section 8–9T from left to right changes the code transmitted to the track sections 10T and 11–12T to a 75 code. The reception of such code at signal 11 causes that signal to be put to caution, and the establishment of a 75 code in the track section 10T causes the inverse code transmitted from right to left through the track section 10T for the control of signal 10 to be of a rate corresponding to the tuned circuit for the relay 10D. Thus, the relay 10D is picked up, and the picking up of such relay causes the clearing of the east bound leaving signal 10.

More specifically, the dropping away of the relay 9H (see Fig. 2B) opens the circuit by which the code transmitter relay 10CP has been active for the transmission of a 180 driven code at front contact 49, and the closing of back contact 49 provides for the code transmitter relay 10CP to be energized during each impulse provided by the oscillator 75CT¹. The relay 10CP is energized for each impulse of that oscillator by a circuit closed from (+), including contact 116 of oscillator 75CT¹, front contact 117 of relay 10H, back contact 118 of relay 10S, back contact 49 of relay 9H, and winding of relay 10CP, to (−).

The changing of the rate of the inverse code normally received at the left-hand end of track section 10T causes sufficient current to flow through the tuned circuit of relay 10D which is shunted across the primary winding of the decoding transformer 10TF, to cause the relay 10D to be picked up. The picking up of such relay reverses the polarity of energization for the signal 10 upon the shifting of contacts 88 and 85 to cause such signal to display a clear indication.

The changing of the code transmitted from left to right through the track section 10T from 180 to 75 causes the relay 10–12D (see Fig. 2C) to be dropped away, but the relay 10H¹ is of course maintained picked up. The shifting of the contacts of the relay 10–12D causes the code transmitter relay 12CP to be active to follow the code provided by the oscillator 75CT² rather than the oscillator 180CT². The relay 12CP becomes inactive to follow the oscillator 180CT² upon the opening of front contact 57 of relay 10–12D, and becomes active to follow the oscillator 75CT² in accordance with the closure of a circuit during each impulse of such oscillator extending from (+), including contact 119 of oscillator 75CT², back contact 121 of relay 10D¹, back contact 57 of relay 10–12D, back contact 58 of relay 12S, front contact 59 of relay 10H¹, and winding of relay 12CP, to (−).

The changing of the driven code transmitted from left to right through the track section 11–12T causes the dropping away of the relay 11–13D at the right-hand end of track section 11–12T (see Fig. 2D), but the relay 11H at that end of the track section is of course maintained picked up. The dropping away of the relay 11–13D causes the signal 11 to be put to caution in accordance with the shifting of the polarity of energization of the winding of such signal in an obvious manner by the shifting of contacts 66 and 69 of relay 11–13D. It will be noted that the dropping away of relay 11–13D in no way affects the circuit which has been described for the code transmitter 13CP¹ for the left-hand end of track section 13T which is normally active for the transmission of a 180 driven code. Therefore, the conditions of signals 13 and 14 at the left-hand end of the passing siding 25 are maintained as heretofore described when considering the normal conditions of the system.

With reference to Figs. 1D and 1E it will be noted that the passage of the east bound train A through the track section 5–6T and into the track section 7T causes no change in the conditions of the signals associated with the siding 24 and with the stretch of single track between the sidings 24 and 25, and causes no change in the transmission of codes for the track sections associated therewith from the conditions which have just been described.

*East bound train enters siding section.*—The passage of an east bound train into the siding section 8–9T has no material effect upon the direction of code transmission and the rates for the track sections in the stretch of single track between the sidings 24 and 25 over the conditions which have just been described for that stretch of track. The conditions of code transmission through such stretch of single track corresponds to the condition illustrated in Fig. 1B for the stretch of single track between the sidings 23 and 24. The presence of the east bound train in the track section 8–9T of course causes the relay 8H to be dropped away, and the dropping away of such relay upon the shifting of contact 113 causes the code for transmission by the code transmitter relay 7CP to be changed from a 180 to a 120 rate. Thus, the closing of back contact 113 causes the code transmitter relay 7CP to transmit a 120 code in accordance with the pulsing of contact 130 of the oscillator 120CT. The transmission of a 120 code from right to left through the track section 7T is instrumental in the restoration to normal of the directions for code transmission through the stretch of single track between the sidings 23 and 24 in a manner corresponding to that which will be hereinafter described in detail with respect to the restoration to the normal conditions in the rear of a train for the stretch of single track between the sidings 24 and 25.

*APB tumble-down.*—To consider further the mode of operation of the system upon passage of an east bound train, it will be assumed that the train accepts the clear signal 10 and enters the track section 10T at a time when the trackway is unoccupied for some distance in advance of the train. The shunting of track section 10T of course causes the relay 10H (see Fig. 2B) to be dropped away, and the dropping away of that relay causes the signal 10 to be put to stop in an obvious manner by the opening of front contacts 86 and 87.

The presence of the east bound train in the track section 10T of course shunts the driven code being transmitted from left to right through that track section, and causes the relay 10H[1] (see Fig. 2C) at the right-hand end of the track section 10T to become inactive when the pulsing of contact 51 of the code following track relay 10TR[1] ceases. The dropping away of relay 10H[1] opens the circuit at front contact 59 by which the code transmitter 12CP has been active for the transmission of a driven code from left to right through the track section 11–12T, thus causing the removal of the driven code being transmitted through the track section 11–12T.

The relay 11TR (see Fig. 2D) at the right-hand end of track section 11–12T becomes inactive in accordance with the removal of the driven code formerly transmitted to such relay, and the relay 11H is dropped away when contact 61 of relay 11TR becomes inactive. The dropping away of such relay of course causes the signal 11 to be put to stop by the opening of the circuit for that signal at front contacts 67 and 68.

The opening of front contact 64 of relay 11H upon the dropping away of that relay, renders the relay 13CP[1] inactive for the transmission of a driven code from left to right through the track section 13T, and the removal of such code causes the relay 13TR (see Fig. 2E) at the right-hand end of track section 13T to become inactive. The relay 13H at the right-hand end of track section 13T is of course dropped away when the contact 70 of relay 13TR becomes inactive, and the dropping away of such relay causes the signal 13 to be put to stop upon the opening of front contacts 72 and 73.

The dropping away of the relay 13H causes the relay 14CP to become inactive for the transmission of a driven code from left to right through the track section 14–15T by the opening of front contact 131. The relay 14CP cannot become active to transmit a 75 code at this time because of the contact 132 of the relay 13S being open. The relay 13S is of course dropped away because it is a directional stick relay which is picked up only by west bound traffic.

Inasmuch as the control apparatus at the right-hand end of the track section 14–15T corresponds to that illustrated at the right-hand end of track section 8–9T, it will be readily apparent from the description as it has been set forth with respect to the entrance of the train into the stretch of single track between the sidings 23 and 24 how the removal of the driven code which is normally transmitted from left to right through the track section 14–15T is effective to cause the reversal in the direction of driven code transmission through that track section. Thus, assuming the trackway at the right of the track section 14–15T to be unoccupied for some distance, a 180 code will be transmitted from right to left through the track section 14–15T in a manner corresponding to a similar condition which has been described with respect to the siding section 8–9T.

The reception at the left-hand end of track section 14–15T of the 180 driven code causes the pulsing of contact 133 of relay 14TR at a 180 rate, and the pulsing of such contact causes the picking up of the relay 14H by the energization of a circuit corresponding to that described in detail for the energization of the relay 9H. With the relay 13H dropped away, the closure of back contacts 134 and 135 of such relay causes the tuned circuit for the relay 13–14D to be shunted across the primary winding of the transformer 14TF in a manner corresponding to that which has been described in detail with respect to the control of the relay 10–12D. The relay 13–14D is therefore picked up in accordance with the reception of a 180 driven code at the left-hand end of track section 14–15T.

Conditions are therefore established for the clearing of signal 14 in accordance with the energization of its winding by the proper polarity for clearing such signal upon the closure of a circuit extending from (+), including back contact 125 of relay 13H, front contact 136 of relay 13–14D, front contact 137 of relay 14H, winding of signal 14, front contact 138 of relay 14H, and front contact 139 of relay 13–14D, to (−).

The relay 13CP is active to transmit a 180 driven code from right to left through the track section 13T in accordance with the energized condition of the relays 13–14D and 14H with the relay 13H dropped away. The relay 13CP is active to follow the oscillator 180CT[4] by the energization for each impulse of the oscillator of a circuit closed from (+), including contact 140 of oscillator 180CT[4], front contact 141 of relay 13–14D, front contact 142 of relay 14H, upper winding of relay 13CP, and back contact 143 of relay 13H, to (−).

The reception at the left-hand end of track section 13T of the 180 driven code causes the pulsing at a 180 rate of the contact 71 (see Fig. 2D) of relay 13TR[1], and the pulsing of such contact causes the relay 13H[1] to be picked up. In accordance with the dropped away condition of the relay 11H at this time, the closure of back contacts 144 and 145 of such relay connects the tuned circuit for the relay 11–13D across the transformer 13TF[1] to cause such relay to be picked up by the energization of a tuned circuit corresponding to that which has been described more in detail for the control of the relay 10–12D.

The relay 11CP becomes active for the transmission of a 180 driven code from right to left through the track section 11–12T upon the picking up of the relays 13H[1] and 11–13D by the energization of its lower winding for each impulse produced by the oscillator 180CT[3] in acordance with the closure of a circuit extending from (+), including contact 126 of oscillator 180CT[3], front contact 146 of relay 11–13D, back contact 147 of relay 11S, front contact 148 of relay 13H[1], lower winding of relay 11CP, and back contact 149 of relay 11H, to (−).

At the left-hand end of track section 11–12T, the reception of the 180 driven code causes the picking up of the relays 12H and 10–12D (see Fig. 2C) because of the pulsing at a 180 rate of contact 80 of relay 12TR. The relay 10–12D is picked up because it is shunted across the primary winding of the transformer 12TF by an obvious circuit closed at back contacts 52 and 55 of relay 10H[1].

The conditions are therefore established for the clearing of signal 12 in that the relays 12H and 10–12D are picked up when the relay 10H[1] is dropped away. The signal 12 is energized with the proper polarity for causing such signal to clear upon the closure of a circuit extending from (+), including back contact 81 of relay 10H[1], front contact 150 of relay 10–12D, front contact 151 of relay 12H, winding of signal 12, front contact 152 of relay 12H, and front contact 153 of relay 10-12D, to (—).

Thus, the signals 12 and 14 are clear for governing passage of the east bound train through the stretch of single track between the sidings 24 and 25, the opposing signals 11 and 13 having been put to stop as is characteristic of absolute-permissive-block signaling systems. The opposing signal 15 at the right-hand end of siding 25 is also put to stop in accordance with the removal of the driven code normally transmitted from left to right through the track section 14-15T in a manner similar to that described with reference to the putting to stop of the signal 9 when an east bound train is assumed to have entered the stretch of single track between the sidings 23 and 24.

*Passage of east bound train through the stretch between sidings.*—After having considered the mode of operation of the system upon entrance of an east bound train into a stretch of single track between sidings, consideration will be given to the passage of a train through such stretch of single track, and to the means by which the conditions are restored to normal in the rear of the train. Although passage of the train will be assumed to be effective between the sidings 24 and 25, reference can be made to Figs. 1B through 1F for a consideration of the codes employed and the direction of code transmission under various conditions of traffic, the conditions illustrated in such figures for the stretch of single track between the sidings 23 and 24 being readily identified as similar to the conditions which will be assumed for the stretch of single track between the sidings 24 and 25.

The entrance of an east bound train into the track section 10T in addition to causing the APB tumble-down as has been described, causes the picking up of the special stick relay 10S (see Fig. 2B) for the signal 10. The picking up of such stick relay is not essential to the mode of operation for the passage of a single train, as the primary function of such relay is associated with conditions involving opposing trains. Inasmuch as the relay 10S is picked up, however, upon passage of an east bound train past signal 10, the circuit for its energization will be considered at this time, although the relay has no apparent function in the system under the conditions of traffic which are being considered. The relay 10S is picked up when the track section 10T is shunted by the train in accordance with the deenergized condition of the relays 9H and 10H. The pick-up circuit for relay 10S extends from (+), including back contact 154 of relay 10H, winding of relay 10S, and back contact 155 of relay 9H, to (—). The picking up of such relay closes a stick circuit at front contact 156 for shunting contact 154 of relay 10H out of the circuit just described. It will be obvious from the circuits described for the relay 10S that such relay is dropped away as soon as the track section 8-9T has become unoccupied in the rear of the train so as to allow the picking up of the relay 9H to open the circuit for relay 10S at back contact 155.

When the track section 8-9T becomes unoccupied in the rear of an east bound train, assuming there is to be no following train, the relay 9TR at the right-hand end of track section 8-9T is pulsed in accordance with the reception of a 180 driven code which is transmitted from left to right through that track section. This is because the relay 7H for the right-hand end of the track section 7T has become picked up to render the code transmitter relay 8CP active at a 180 rate by the energization of a circuit which has been described when considering the normal conditions of the system. The means by which the code is restored for the track section 7T will be better understood upon considering restoration of a code in track section 13T after passage of an east bound train.

The presence of an east bound train in the track section 10T in approach of signal 12 causes the picking up of the stick relay 12S (see Fig. 2C) for such signal by the energization of a circuit extending from (+), including front contact 157 of relay 12H, back contact 158 of relay 10H¹, and winding of relay 12S, to (—). Such relay is maintained picked up after the passage of the train past the signal 12 by its stick circuit closed from (+), including back contact 157 of relay 12H, front contact 159 of relay 12S, and winding of relay 12S, to (—). Relay 12S is sufficiently slow acting to be maintained picked up during the shifting of contact 157 of relay 12H for the establishment of the stick circuit.

As the east bound train progresses through the stretch of single track between the sidings 24 and 25, the passage of the clear signal 12 causes the dropping away of the relay 12H for the track section 11-12T, and the dropping away of such relay causes the signal 12 to be put to stop upon the opening of front contacts 151 and 152.

It will be noted with reference to Figs. 1C and 1D that the passage of an east bound train from track section 10T to track section 11-12T causes no change in the codes transmitted in advance of the train, the conditions being similar to those illustrated in Figs. 1C and 1D for the passage of the train A from the track section 4T to the track section 5-6T.

Inasmuch as there is assumed to be no following train, and a 180 driven code has been restored for transmission from left to right through the track section 8-9T, the relay 10CP (see Fig. 2B) at the left-hand end of track section 10T is active to transmit a 180 driven code through such track section by the energization of a circuit which has been described when considering the normal conditions of the system. Such circuit is closed at front contact 49 in accordance with the picked up condition of the relay 9H.

At the right-hand end of track section 10T, the track relay 10TR¹ (see Fig. 2C) becomes active when the track section 10T becomes unoccupied in the rear of the train, and the pulsing of contact 51 of such relay causes the relay 10H¹ to be picked up. The closure of front contacts 52 and 55 of the relay 10H¹ connects the tuned circuit for the relay 10-12D across the primary winding of the transformer 10TF¹. Thus, the relay 10-12D is picked up. The code transmitter relay 10CP¹ cannot become active at this time for the transmission of a driven code from right to left through the track section 10T because the circuit by which it normally transmits an inverse code is open at front contact 83 of relay 12H. The circuit for the lower winding of relay 10CP¹ including back contact 83 of relay 12H is open at this time at front contact 160 of relay 10D¹ as such relay can be picked up only when a 120 code is received at the right-hand end of track section 10T. Thus although a 180 driven code is transmitted from left to right through the track section 10T, there is no code transmitted from right to left through that track section, and therefore the relay 10H at the left-hand end of track section 10T remains dropped away.

When the track section 11-12T becomes unoccupied upon further progress of the east-bound train through the stretch of single track between the sidings 24 and 25, there is no change in the conditions of code transmission in the rear of the train as restoration of code transmission does not become effective at this time for the track section 11-12T. This is because the circuit for the code transmitter relay 12CP is open at back contact 58 of the stick relay 12S which is picked up at this time. By preventing the transmission of a driven code from left to right through the track section 11-12T under such traffic conditions, the west-bound signal 11 is maintained at stop in accordance with the desired mode of operation in an absolute-permissive-block signaling system.

To consider further progress of the train through the stretch of single track between sidings 24 and 25, it will be assumed that the track section 13T becomes unoccupied in the rear of the train as the train proceeds into the siding section 14-15T. The entrance of the train into the track section 14-15T of course causes signal 14 to be put to stop by the opening of the circuit for such signal at front contacts 137 and 138 of relay 14H (see Fig. 2E).

At the time the track section 13T becomes unoccupied in the rear of the train, the code transmitter relay 13CP¹ (see Fig. 2D) at the left-hand end of track section 13T cannot become effective for the transmission of a code because the circuit by which it is normally active is opened at front contact 64 of relay 11H, and another circuit by which it is active under certain conditions is opened at front contact 161 of the relay 11S which is dropped away as such relay is picked up only for west-bound traffic.

At the right-hand end of track section 13T, the code transmitter relay 13CP (see Fig. 2E) becomes active for the transmission of a 120 driven code in accordance with the dropping away of the relays 13H and 14H. The relay 13CP is picked up for each impulse of the oscillator 120CT⁴ upon the energization of a circuit extending from (+), including contact 162 of oscillator 120CT⁴, back contact 142 of relay 14H, upper winding of relay 13CP, and back contact 143 of relay 13H, to (−).

The reception of the 120 driven code at the left-hand end of track section 13T, when such track section becomes unoccupied in the rear of the train, causes the picking up of relay 13H¹ (see Fig. 2D), and also causes the picking up of the relay 11-13D¹ because the circuit for such relay is tuned to a 120 rate, and because the dropped away condition of the relay 11H connects the tuned circuit for such relay across the primary winding of the transformer 13TF¹ by the closure of back contacts 144 and 145 of relay 11H.

Conditions are now established by which the code transmitter relay 11CP for the right-hand end of track section 11-12T becomes effective for the transmission of a 120 driven code from right to left through the track section 11-12T. The relay 11CP is picked up for each impulse of the oscillator 120CT³ upon the energization of a circuit extending from (+), including contact 163 of oscillator 120CT³, front contact 164 of relay 11-13D¹, back contact 146 of relay 11-13D, back contact 147 of relay 11S, front contact 148 of relay 13H¹, lower winding of relay 11CP, and back contact 149 of relay 11H, to (−).

At the left-hand end of track section 11-12T, the picking up of relay 12H (see Fig. 2C) in accordance with the reception of the 120 code causes the dropping away of the stick relay 12S by opening its stick circuit at back contact 157, the pick-up circuit for such relay being already open at back contact 158 of relay 10H¹. The picking up of the relay 12H at the left-hand end of track section 11-12T closes front contact 83 to render the code transmitter relay 10CP¹ for the right-hand end of track section 10T active to transmit an inverse code through the track section 10T in the manner heretofore described when considering the normal conditions of the system.

Upon the dropping away of the stick relay 12S, the code transmitter relay 12CP becomes active to transmit a 180 driven code from left to right through the track section 11-12T. The relay 12CP is picked up for each impulse of the oscillator 180CT² by the energization of a circuit which has been described when considering the normal conditions of the system.

It will be noted that at this time driven codes are being transmitted in both directions through the track section 11-12T, a 120 driven code being transmitted from right to left through such track section, and a 180 driven code being transmitted from left to right through such track section. This condition is generally known to those familiar with the art as a "code fight." As a means for settling which code shall overrule the other, it is provided that the code transmitter relay 11CP at the right-hand end of the track section 11-12T will be rendered inactive when the relay 11H for that end of the track section is picked up. Even if the relay 12H should be momentarily dropped away during the code fight, the relay 12CP would not be affected as its circuit is not dependent upon relay 12H. The reception of the driven code transmitted through the track section 11-12T from left to right is effective to pulse the relay 11TR (see Fig. 2D) at some interval when the impulses of the two codes being transmitted are out of correspondence, and the pulsing of contact 61 of relay 11TR causes the relay 11H to be picked up, thus rendering the code transmitter at the right-hand end of the track section 11-12T inactive.

The activity of the contact 61 of the code following track relay 11TR causes the relay 11CP to become active for the transmission of an inverse code from right to left through the track section 11-12T. The circuit by which the relay 11CP is active is closed at front contact 79 of relay 13H¹. The transmission of an inverse code from right to left through the track section 11-12T maintains the relay 12H at the left-hand end of such track section picked up.

The reception of the 180 driven code at the right-hand end of track section 11-12T, in causing the picking up of relay 11H shifts the connection of the tuned circuits for the relays 11-13D¹ and 11-13D from the transformer 13TF¹ to the transformer 11TF upon the closure of front contacts 144 and 145. Thus, the relay 11-13D¹ becomes dropped away, and the relay 11-13D becomes picked up because of the 180 code rate received. The conditions are therefore established for the clearing of signal 11 in accordance with the energized condition of the relays 11H and 11-13D.

The conditions are now established whereby the relay 13CP¹ becomes active for the transmission of a 180 driven code from left to right through the track section 13T, such relay being picked up for each impulse of the oscillator 180CT³ by the energization of a circuit corresponding to that which has been described when considering the normal conditions of the system. The activity of the relay 13CP¹ causes a "code fight" in the track section 13T, and the code transmitter relay 13CP (see Fig. 2E) at the right-hand end of track section 13T is overruled in a manner corresponding to that which has just been described with respect to the "code fight" in track section 11-12T, the 180 driven code received at that right-hand end of track section 13T being effective to cause the relay 13H to be picked up. The picking up of such relay is effective to stop the transmission of the 120 driven code by the relay 13CP upon opening the circuit for such relay at back contact 143.

The picking up of relay 13H connects the tuned circuit for the relay 13-14D across the primary winding of the transformer 13TF upon closing front contacts 134 and 135 so as to cause the relay 13-14D to be picked up. The conditions are therefore established for the clearing of signal 13 in accordance with the energization of relays 13H and 13-14D.

Inasmuch as it is assumed that the track section 14-15T is still occupied by a train, the relay 13CP cannot become active for the transmission of an inverse code through the track section 13T from right to left because the circuit which is normally closed for such transmission is open at front contact 76 of relay 14H. Such being the case, the relay 13H¹ (see Fig. 2D) at the left-hand end of track section 13T is dropped away, and the dropping away of such relay causes the relay 11CP to become inactive for the transmission of an inverse code through the track section 11-12T by the opening of the circuit for the upper winding of such relay at front contact 79.

In accordance with the removal of the inverse code from the track section 11-12T, the relay 12H (see Fig. 2C) at the left-hand end of such track section is dropped away, and the dropping away of such relay in turn causes the code transmitter relay 10CP¹ to become inactive by opening the circuit for its lower winding at front contact 83. The removal of the inverse code from the track section 10T of course causes the relay 10H (see Fig. 2B) at the left-hand end of track section 10T to be dropped away, but the dropping away of such relay cannot affect the inverse code transmitted through the track section 8-9T as the lower winding of relay 9CP is connected directly across the secondary winding 40 of the transformer 9TF.

When the track section 13T becomes unoccupied in the rear of the east-bound train, the conditions are established whereby the pick-up circuit is closed for the stick relay 13S, although the picking up of such relay has no apparent function in the system at this time. The relay 13S is picked up, because the presence of the train in the track section 14-15T causes sufficient energy to flow through the track circuit to cause the approach relay 13AR to become picked up. It is well known by those familiar with the art that the use of an approach relay 13AR in this capacity can be such as to cause the relay to be picked up when a train is a certain given distance away from the signal location with which such relay is associated. Such being true, it is assumed that the characteristics of the relay 13AR are such that the relay is picked up only when the left-hand half of the track section 14-15T is occupied by a train. Such arrangement provides that the relay is non-responsive to the shunting of the track section 14-15T at the right-hand end thereof as would be the case if a train were to move in or out of the siding 25 at the right-hand end of such siding. The pick-up circuit by which the relay 13S is energized under such conditions is closed from (+), including front contact 170 of relay 13AR, front contact 171 of relay 13H, and winding of relay 13S, to (−). As the east-bound train proceeds through the track section 14-15T the relay 13AR is dropped away when the left-hand portion of the track section 14-15T becomes unoccupied in the rear of the train, and the dropping away of such relay opens the circuit which has just been described for the relay 13S at front contact 170.

The code transmitter relay 14CP for the left-hand end of track section 14-15T is active in accordance with the closure of an obvious circuit at front contact 131 of relay 13H to transmit a 180 driven code from left to right through the track section 14-15T. This, it will be noted, corresponds to the normal conditions of code transmission through the siding section.

As the east-bound train proceeds further through the track section 14-15T so as to cause such track section to become unoccupied in the rear of the train, an inverse code is transmitted from right to left through the track section 14-15T so as to cause the picking up of the relay 14H.

The transmission of such inverse code is caused by a code transmitter relay CP (not shown) corresponding to the relay 9CP (see Fig. 2A) at the right-hand end of the track section 8-9T. It will be noted that such CP relay is active for the transmission of an inverse code whenever the code following track relay 9TR is active upon the reception of a code at the right-hand end of track section 8-9T. Therefore, an inverse code is transmitted from right to left through the track section 14-15T as soon as the east-bound train has left such track section.

The reception of the inverse code at the left-hand end of track section 14-15T causes the pulsing of contact 133 (see Fig. 2E) of relay 14TR, and the pulsing of such contact causes the picking up of the relay 14H. The picking up of the relay 14H, however, can not cause the clearing of signal 14 because the circuit for such signal is open at back contact 125 of the relay 13H. This is in accordance with the normal conditions of the system.

As soon as the relay 14H is picked up, the closure of front contact 76 of such relay renders the code transmitter relay 13CP effective for the transmission of an inverse code from right to left through the track section 13T. The relay 13CP becomes active under such conditions by the energization of a circuit for its lower winding which has been described when considering the normal conditions of the system.

The reception of the inverse code at the left-hand end of track section 13T causes the picking up of the relay 13H¹ (see Fig. 2D) because of the pulsing of contact 77 of relay 13TR¹, and the picking up of such relay renders the code transmitter relay 11CP active for the transmission of an inverse code through the track section 11-12T by the energization of a circuit which has been described for the upper winding of such relay.

At the left-hand end of track section 11-12T, the contact 80 (see Fig. 2C) of relay 12TR is pulsed in accordance with the reception of the inverse code, and the pulsing of such contact causes the picking up of the relay 12H. The signal 12 cannot be cleared, however, because its circuit is open at back contact 81 of relay 10H¹ in accordance with the normal conditions of the system. The energized condition of the relay 12H causes the code transmitter 10CP¹ to be active for the transmission of an inverse code from right to left through the track section 10T because of the closure of front contact 83 of relay 12H to establish a circuit for the lower winding of such code transmitter relay.

At the left-hand end of the track section 10T, the reception of the inverse code causes the pulsing of contact 84 (see Fig. 2B) of the relay 10TR, and the pulsing of such contact causes the picking up of the relay 10H. The picking up of the relay 10H in combination with the de-energized condition of the relay 10D, which is responsive only to a 75 code, conditions a circuit which has been described when considering the normal conditions of the system, for the energization of signal 10 with a polarity to cause such signal to display a caution indication.

Having thus described in detail the mode of operation of the parts of the system associated with the siding 24 and the stretch of single track between sidings 24 and 25 upon passage of an east-bound train along such trackway to such an extent as to show how restoration becomes effective to the normal conditions of the system after passage of such train, it is to be understood that such mode of operation is typical of that provided through similar track portions in this embodiment of the present invention, and it is to be understood that the system as described can be applied to other similar portions of trackway in accordance with the requirements of practice, more or less signal locations being provided as required by the particular conditions encountered.

*Passage of west-bound trains.*—The consideration of the conditions for passage of west-bound trains is less involved than that for east-bound trains in that reversal in the direction of code transmission is not required, the direction of code transmission through the various track sections being maintained as has been described when considering the normal conditions of the system. In order that a clear understanding may be had, however, of the manner in which the normal conditions are restored in the rear of a west-bound train, a condition will be considered whereby the passage of a west-bound train is effective through the stretch of single track between the sidings 24 and 25 and sufficiently beyond the siding 24 to allow for the complete restoration to normal of the conditions of the system as illustrated in Figs. 2A through 2E. The various steps in the progress of a west-bound train are illustrated in Fig. 1B through 1E for the passage of a train from siding 26 to siding 25. The steps in the progress of a west-bound train from siding 25 through the siding 24 will be readily identified as affecting the system of code transmission in a manner corresponding to similar steps illustrated for the passage of the train B from siding 26 to siding 25 in Figs. 1C through 1E.

To consider passage of a west-bound train through the trackway illustrated in Figs. 2A through 2E, it will be assumed that the train enters the track section 14–15T at a time when the trackway is unoccupied for some distance in advance of the train. The entrance of the west-bound train into the track section 14–15T causes the dropping away of the relay 14H (see Fig. 2E) at the left-hand end of the track section 14–15T, and the dropping away of such relay renders the code transmitter relay 13CP inactive for the transmission of an inverse code by opening the circuit for its lower winding at front contact 76.

In accordance with the removal of the inverse code from the track section 13T, the relay 13H¹ (see Fig. 2D) at the left-hand end of such track section becomes dropped away, and the dropping away of such relay renders the code transmitter relay 11CP inactive for the transmission of an inverse code through the track section 11–12T upon the opening of front contact 79 for the upper winding of that relay.

The removal of the inverse code from the track section 11–12T causes the dropping away of the relay 12H (see Fig. 2C) at the left-hand end of track section 11–12T, and the dropping away of such relay causes the signal 12 to be put to stop by opening the circuit for the winding of such signal at front contacts 151 and 152. In accordance with the dropping away of the relay 12H, the code transmitter relay 10CP¹ becomes inactive for the transmission of an inverse code through the track section 10T upon the opening of the circuit for its lower winding at front contact 83.

At the left-hand end of the track section 10T, the relay 10H (see Fig. 2B) is dropped away upon the removal of the inverse code from the track section 10T, and the dropping away of such relay causes the signal 10 to be put to stop by the opening of front contacts 86 and 87. The de-energization of the relay 10H has no effect upon the code transmitter relay 9CP for the track section 8–9T, as the lower winding of such relay is connected directly to the secondary winding 40 of the transformer 9TF. Therefore the conditions through the siding section 8–9T are maintained as described when considering the normal conditions of the system.

As the west-bound train proceeds sufficiently through the track section 14–15T to cause the picking up of the approach relay 13AR (see Fig. 2E), the stick relay 13S is picked up by the energization of a circuit which has been described, and a stick circuit for such relay is closed when the train enters the track section 13T so as to cause the relay 13H to be dropped away. Such stick circuit extendings from (+), including front contact 172 of relay 13S, back contact 171 of relay 13H, and winding of relay 13S, to (—). The entrance of a west-bound train into the track section 13T causes the dropping away of the relay 13H and the dropping away of such relay causes signal 13 to be put to stop by opening front contacts 72 and 73.

With the relay 13S picked up, and the relay 13H dropped away, a circuit is closed by which the code transmitter relay 14CP becomes active for the transmission of a driven code from left to right through the track section 14–15T, such transmission being effective of course to cause the picking up of the H relay at the right-hand end of the track section 14–15T only after such track section has become unoccupied in the rear of the west-bound train. The relay 14CP is energized under such conditions for each impulse of the oscillator 75CT⁴ by a circuit closed from (+), including contact 173 of oscillator 75CT⁴, front contact 132 of relay 13S, back contact 131 of relay 13H, and winding of relay 14CP, to (—).

When the track section 14-15T becomes unoccupied in the rear of the west bound train, the transmission of a 75 driven code from left to right through the track section 14-15T is effective to cause the picking up of the relay H for the right-hand end of the track section, and the reception of such code at the right-hand end of the track section causes the transmission of an inverse code back through the track section 14-15T in a manner similar to that illustrated with respect to the right-hand end of the similar track section 8-9T. Thus, the relay 14H is picked up under such conditions, and the picking up of that relay with the track section 13T occupied by a west bound train causes the winding of signal 14 to be energized with a polarity to cause that signal to display a caution indication. The circuit by which the winding of signal 14 is energized under such conditions extends from (+), including back contact 125 of relay 13H, back contact 139 of relay 13-14D, front contact 138 of relay 14H, winding of signal 14, front contact 137 of relay 14H, and back contact 136 of relay 13-14D, to (—). It will be noted that the signal 14 is at caution rather than clear because the condition under which the signal indication is provided is for the possibility of a back-up move into the siding section 14-15T. The conditions for the control of signal 14 are different from those which would be effective for the straight progress of an east bound train in that the normal conditions for the direction of code transmission have been restored for the track section 14-15T where it will be noted that the opposite direction of code transmission through such track section is established upon the straight passage of an east bound train.

When the west bound train is sufficiently in approach of signal 11 to cause the series relay 11AR (see Fig. 2D) to become picked up, the stick relay 11S is picked up by the energization of a circuit extending from (+), including front contact 174 of relay 11H, front contact 175 of relay 11AR, and winding of relay 11S, to (—). The relay 11S is maintained picked up after the train passes signal 11 by the energization of a stick circuit extending from (+), including back contact 174 of relay 11H, front contact 176 of relay 11S, and winding of relay 11S, to (—). The relay is sufficiently slow in dropping away to allow for the shifting of contact 174 of relay 11H.

To consider further progress of a west bound train along the trackway, it will be assumed that the train enters the track section 11-12T, and that the track section 13T becomes unoccupied in the rear of the train. The entrance of the train into the track section 11-12T of course causes the dropping away of the relays 11-13D and 11H, and the dropping away of relay 11H causes the signal 11 to be put to stop by the opening of contacts 67 and 68.

With the track section 13T unoccupied in the rear of the train, and with the stick relay 11S picked up, the code transmitter relay 13CP¹ becomes active for the transmission of a 120 driven code from left to right through the track section 13T. The relay 13CP¹ is picked up for each impulse of the oscillator 120CT³ by the energization of a circuit extending from (+), including contact 177 of oscillator 120CT³, front contact 161 of relay 11S, back contact 64 of relay 11H, and winding of relay 13CP¹, to (—).

The reception of the 120 driven code at the right-hand end of track section 13T causes the relay 13H (see Fig. 2E) to be picked up. The relay 13D having its circuit tuned to a 120 rate and connected across the primary winding of the transformer 13TF, is also picked up upon the reception of the 120 driven code at the right-hand end of track section 13T, and the picking up of such relay closes a circuit by which the code transmitter relay 13CP is rendered active for the transmission of an inverse code from right to left through the track section 13T. Such circuit extends from the upper terminal of the secondary winding 127 of transformer 13TF, including front contact 178 of relay 13D, and lower winding of relay 13CP, to the lower terminal of the secondary winding 127 of transformer 13TF.

In accordance with the transmission from right to left through the track section 13T of an inverse code, the relay 13H¹ (see Fig. 2D) is picked up, but the closure of front contact 148 of such relay cannot be effective for rendering the code transmitter relay 11CP active, because the circuit for the lower winding of such relay is opened at back contact 147 of the stick relay 11S. Therefore, there is no code transmitted through the track section 11-12T following the west bound train proceeding through such track section.

When the track section 11-12T becomes unoccupied in the rear of a west bound train, the relay 12CP (see Fig. 2C) cannot become active for the transmission of a driven code in the track section 11-12T because the circuit for such relay is open at front contact 59 of relay 10H¹, such relay being dropped away of course because of the presence of the train in track section 10T. Therefore when the track section 11-12T becomes unoccupied in the rear of the train, no code is transmitted in either direction through such track section, and thus the west bound signal 11 governing entrance to such track section is held at stop.

To consider further progress of the west bound train, it will be assumed that such train accepts the clear signal 9 and enters the track section 8-9T. The shunting of track section 8-9T of course causes the dropping away of the relay 9H (see Fig. 2B) and the dropping away of such relay causes signal 9 to be put to stop by the opening of front contacts 44 and 45.

The stick relay 10S is picked up when the train enters the track section 8-9T in accordance with the dropped away condition of the relays 9H and 10H upon the energization of a circuit which has been described. The closing of the stick contact 156 for such relay shunts contact 154 of relay 10H out of the circuit to cause the stick relay 10S to be maintained picked up after the energization of the relay 10H.

The conditions are now established whereby the code transmitter relay 10CP is active for the transmission of a 120 driven code from left to right through the track section 10T. The relay 10CP is energized for each impulse of the oscillator 120CT¹ by a circuit closed from (+), including contact 179 of oscillator 120CT¹, front contact 118 of relay 10S, back contact 49 of relay 9H, and winding of relay 10CP, to (—).

Thus, when the track section 10T becomes unoccupied in the rear of the train, the pulsing of the relay 10TR¹ (see Fig. 2C) at a 120 rate causes the picking up of the relay 10D¹ which is tuned to such rate and connected across the primary winding of the transformer 10TF¹. The relay 10H¹ is of course picked up under such conditions, and the picking up of such relay opens a circuit by which the relay 10CP¹ has been active for the transmission of a 120 code from right to left through the track section 10T. That is, there is a momentary "code fight" at this time between the code transmitters for the opposite ends of track section 10T, but the circuit for the code transmitter relay 10CP¹ is such as to cause that relay to be rendered inactive when the two code transmitters are sufficiently out of step as to cause the picking up of the relay 10H¹. The relay 10CP¹ is active prior to the settling of the "code fight" by the energization for each impulse of the oscillator 120CT² of a circuit extending from (+), including contact 181 of oscillator 120CT², back contact 182 of relay 12H, upper winding of relay 10CP¹, and back contact 183 of relay 10H¹, to (—).

With the relay 10D¹ picked up, a circuit is established whereby the relay 12CP becomes active for the transmission of a 120 driven code from left to right through the track section 11–12T. The relay 12CP is picked up for each impulse of the oscillator 120CT² under such conditions by the energization of a circuit extending from (+), including contact 184 of oscillator 120CT², front contact 121 of relay 10D¹, back contact 57 of relay 10–12D, back contact 58 of the east bound stick relay 12S, front contact 59 of relay 10H¹, and winding of relay 12CP, to (—).

At the right-hand end of track section 11–12T, the reception of the 120 driven code causes the picking up of the relay 11H (see Fig. 2D), and the picking up of such relay closes a circuit at front contacts 144 and 145 whereby the tuned circuit for the relay 11–13D¹ is connected across the primary winding of the transformer 11TF. Thus, the relay 11–13D¹ becomes picked up because the circuit for the energization of such relay is tuned to a 120 rate.

The picking up of the relay 11H establishes a circuit by which the signal 11 is caused to display a caution indication. Such circuit extends from (+), including back contact 69 of relay 11–13D, front contact 68 of relay 11H, winding of signal 11, front contact 67 of relay 11H, and back contact 66 of relay 11–13D, to (—).

The picking up of the relay 11H causes the dropping away of a stick relay 11S by opening the stick circuit for such relay at back contact 174. The relay 13CP¹ has been active for the transmission of a 120 driven code through the track section 13T in accordance with the picked up condition of the relay 11S, but the picking up of the relay 11H closes a circuit by which the relay 13CP¹ becomes active for the transmission of a 120 driven code by the energization for each impulse of the oscillator 120CT³ of a circuit extending from (+), including contact 177 of oscillator 120CT³, front contact 63 of relay 11–13D¹, front contact 64 of relay 11H, and winding of relay 13CP¹, to (—).

The reception of the 120 driven code at the right-hand end of track section 11–12T causes the relay 11CP to be active for the transmission of an inverse code from right to left through such track section because of the closure of front contact 79 of the relay 13H¹. Thus the relay 12H (see Fig. 2C) at the left-hand end of track section 11–12T is picked up upon the reception of such inverse code. The picking up of relay 12H, however, cannot cause the clearing of signal 12, as such signal is normally maintained at stop because of the opening of its circuit at back contact 81 of relay 10H¹.

The closure of front contact 83 of relay 12H renders the relay 10CP¹ active for the transmission of an inverse code from right to left through the track section 10T, and the reception of such code at the left-hand end of that track section causes the picking up of the relay 10H (see Fig. 2B). The picking up of relay 10H causes the signal 10 to be put to caution in accordance with the closure of front contacts 86 and 87, the relay 10D being dropped away at that time because of the 120 code rate of the driven code transmitted from left to right through the track section 10T.

As the west bound train proceeds further into the track section 8–9T so as to be sufficiently in approach of signal 7 as to cause the picking up of the approach relay 7AR (see Fig. 2A), a circuit is closed for the picking up of the stick relay 7S extending from (+), including front contact 185 of relay 7AR, front contact 186 of relay 7H, and winding of relays 7S, to (—). A stick circuit is closed for that relay when the train enters the track section 7T upon the dropping away of relay 7H. Such circuit extends from (+), including front contact 187 of relay 7S, back contact 186 of relay 7H, and winding of relay 7S, to (—).

The dropping away of the relay 7H by the entrance of a west bound train into the track section 7T causes the signal 7 to be put to stop by the opening of the circuit for such signal at front contacts 92 and 93.

With the relay 7H dropped away and the relay 7S picked up, a circuit is closed by which the relay 8CP becomes active for the transmission of a 75 driven code. The relay 8CP is picked up for each impulse of the oscillator 75CT by the energization of a circuit extending from (+), including contact 188 of oscillator 75CT, front contact 189 of relay 7S, back contact 31 of relay 7H, and winding of relay 8CP, to (—).

When the track section 8–9T becomes unoccupied in the rear of the west bound train, the 75 driven code transmitted from left to right through such track section causes the picking up of the relay 9H (see Fig. 2B) at the right-hand end of the track section. The picking up of such relay causes the west bound signal 9 to be put to caution by the energization of the circuit extending from (+), including back contact 46 of relay 9D, front contact 45 of relay 9H, winding of signal 9, front contact 44 of relay 9H, and back contact 43 of relay 9D, to (—).

The picking up of relay 9H causes the dropping away of the stick relay 10S by opening the circuit for such relay at back contact 155. The relay 9H in picking up also closes a circuit for the code transmitter relay 10CP to change its code from a 120 code to a 180 code. Thus, the relay 10CP becomes active for the transmission of a 180 driven code by the energization of a circuit which has been described when considering the normal conditions of the system.

At the right-hand end of track section 10T, the changing of the code from a 120 code to a 180 code causes the relay 10D¹ (see Fig. 2C) to be dropped away, and causes the picking up of the relay 10–12D which is connected to the primary winding of the transformer 10TF¹ under such conditions by the closure of front contacts 52 and 55 of the relay 10H¹. The picking up of the relay 10–12D establishes a circuit for the code transmitter relay 12CP whereby the rate of transmission is changed in the track section 11–12T from a 120 to a 180 rate. The relay 12CP is active for the transmission of the 180 driven code by the energization of a circuit which has been described when considering the normal conditions of the system.

At the right-hand end of the track section 11–12T (see Fig. 2D), the changing of the code from a 120 code to a 180 code causes the relay 11–13D¹ to be dropped away and the relay 11–13D to be picked up, the relay 11–13D having its circuit tuned to the 180 rate. The dropping away of the relay 11–13D¹ under such conditions causes the relay 13CP¹ to be active for the transmission of a 180 driven code by the energization of each impulse of the oscillator 180CT³ of a circuit which has been described when considering the normal conditions of the system.

At the right-hand end of track section 13T the reception of the 180 driven code causes the relay 13–14D (see Fig. 2E) to be picked up, and the relay 13D to be dropped away in accordance with the shifting of the code rates. The picking up of the relay 13–14D closes a circuit which has been described when considering the normal conditions of the system whereby the signal 13 displays a clear indication.

As the west bound train proceeds further along the trackway and the track section 7T becomes unoccupied in the rear of the train, a 120 code is transmitted from left to right through such track section in a manner corresponding to that described under similar traffic conditions for the transmission of a 120 driven code through the track section 13T in the rear of the train. The reception of such code at the right-hand end of track section 7T causes the picking up of relay 7H (see Fig. 2A), and the picking up of that relay causes the dropping away of the stick relay 7S by opening the circuit for such relay at back contact 186, the pick-up circuit being of course open at that time because of the deenergized condition of the approach relay 7AR.

The picking up of relay 7H restores to normal the conditions by which the code transmitter relay 8CP is active for the transmission of a 180 driven code from left to right through the track section 8–9T, and the reception at the right-hand end of track section 8–9T of such 180 code causes the picking up of the relay 9D to cause the clearing of signal 9 by the energization of a circuit which has been described when considering the normal conditions of the system. Thus the restoration to normal in the rear of a west bound train has become complete for the typical sections illustrated in Figs. 2A through 2E.

*Simultaneous entry.*—After having considered the passage of east and west bound trains respectively along the trackway in the present system, it will be readily apparent with reference to Figs. 1B through 1E that the conditions of code transmission in advance of each of the respective trains A and B is not materially changed by the presence of an opposing train. That is, with reference to Fig. 1E, for example, the presence of the train A in the track section 7T causes a 75 driven code to be transmitted from left to right through the track sections 10T and 11–12T, and causes a 180 driven code to be transmitted from left to right through the track section 13T. This condition of code transmission corresponds to that described when considering the passage of an east bound train in detail when it was assumed that the trackway was unoccupied in advance of the train for a sufficient distance as not to affect the codes employed or the indications of the signals. In Fig. 1E the presence of the west bound train B in the track section 16T does not change the conditions of driven code transmission from those conditions which have been described.

And similarly, the conditions of code transmission in advance of the train B in Fig. 1E corresponds to those which have been described when considering the passage of a west bound train when the trackway in advance of such train was assumed to be unoccupied by an opposing train. The direction of code transmission is maintained the same through the track sections between the opposing trains A and B in Fig. 1E as would be effective if the east bound train A were not present. Thus, it will be apparent that the presence of the east bound train A affects the codes transmitted governing east bound traffic for the train B only in the code rates transmitted, the rate transmitted through the track sections 10T and 11–12T being 75 impulses per minute instead of the 180 rate that would be transmitted if the east bound train A were not present. It will therefore be readily apparent how the description which has been set forth for the respective passage of east and west bound trains can be applied to the traffic conditions illustrated in Figs. 1B through 1E.

A further step in the progress of opposing trains can also be considered in which the conditions are similar to those which have been described for the passage of east and west bound trains respectively. This condition is illustrated in Fig. 1F in which it is assumed the train A has entered the track section 8–9T, but the train B has not yet passed the entering signal 15. Under such conditions, no problem of simultaneous entry to the stretch of single track between the sidings 24 and 25 can exist, as the entrance of the train A into the stretch of single track will cause the leaving signal 13 for the siding 25 to be put to stop sufficiently in advance of the train B so as to insure the stopping of the train B in the track section 13T. In other words, the problem of simultaneous entry is not present unless the opposing trains are sufficiently in approach of the leaving signals 10 and 13 so as to make possible substantially simultaneous entry into the stretch of single track between the sidings 24 and 25.

Upon consideration of the conditions illustrated in Fig. 1G, it will be noted that the simultaneous entry problem exists in that the trains A and B are directly in approach of the respective leaving signals 10 and 13. It is under these conditions that a special mode of operation of the system becomes effective to cause the signals 10 and 13 to be put to caution in order to warn the trainmen of the trains A and B respectively that they must be prepared to stop in the rear of the intermediate signals governing their respective directions of traffic. Thus, the entrance of the train B into the track section 14–15T removes the inverse code formerly transmitted through the track sections 10T, 11–12T, 13T and 14–15T momentarily to establish a condition whereby the stick relay 10S for signal 10 is picked up.

After the momentary removal of the inverse code from the track sections 10T, 11–12T, 13T and 14–15T, the picking up of the stick relay 10S causes a change in the driven codes as illustrated in Fig. 1H. Thus, the code transmitted through the track sections 10T and 11–12T is changed from a 75 code to a 120 code, and the reception of the 120 code at the right-hand end of track section 11–12T causes a change in the code transmitted through the track section 13T from a 180 code to a 120 code. The change from a 180 to a 120 driven code in the track section 13T of course causes the D relay for signal 13 to be dropped away, and the dropping away of such relay causes signal 13 to be put to caution. Also, the changing in the driven code rate transmitted through the track section 10T from a 75 to a 120 driven code causes the dropping away of the D relay for signal 10, as the circuit for such D relay is tuned to a 75 rate. The dropping away of such D relay of course causes the signal 10 to be put to caution. The conditions are therefore established whereby the entrance to the stretch of single track between the sidings 24 and 25 is governed for either direction of traffic by a caution signal indication which warns the trainmen that they must be prepared to stop short of the first intermediate signal to be encountered for the particular direction of traffic involved.

Having thus considered the general mode of operation of the system under conditions where simultaneous entry of opposing trains is involved, more specific reference will be made to the circuits which provide such mode of operation.

After having assumed the traffic conditions to exist as illustrated in Fig. 1F, assume that the train B accepts the west bound signal 15 and enters the track section 14–15T as illustrated in Fig. 1B. The presence of the train in the track section 14–15T causes the dropping away of the relay 14H (see Fig. 2E) at the left-hand end of that track section, and the dropping away of such relay renders the relay 13CP inactive for the transmission of an inverse code by opening the circuit for the lower winding of that relay at front contact 76.

At the left-hand end of track section 13T, the removal of the inverse code from that track section causes the dropping away of relay 13H¹ (see Fig. 2D), and the dropping away of such relay renders the code transmitter relay 11CP ineffective for the transmission of an inverse code through the track section 11–12T by the opening of the circuit for the lower winding of such relay at front contact 148.

In accordance with the removal from the track section 11–12T of the inverse code, the relay 12H (see Fig. 2C) at the left-hand end of such track section is dropped away, and the dropping away of such relay renders the code transmitter relay 10CP¹ ineffective for the transmission of an inverse code because of the opening of front contact 83.

The removal of the inverse code from the track section 10T causes the dropping away of the relay 10H (see Fig. 2B) at the left-hand end of such track section, and the dropping away of such relay, with the relay 9H for the right-hand end of track section 8–9T dropped away because of the presence of the train A in that track section, establishes a pick-up circuit which has been described for the stick relay 10S. The picking up of such stick relay closes front contact 156 to shunt the contact 154 of the relay 9H out of the circuit.

Under the conditions prior to the picking up of the relay 10S, the relay 10CP has been active for the transmission of a driven code from left to right through the track section 10T in accordance with the closure of back contact 118 of relay 10S and front contact 117 of relay 10H. The dropping away of the relay 10H of course opens front contact 117, and the shifting of contact 118 of the relay 10S establishes a new circuit by which the relay 10CP is active for the transmission of a 120 code. Such circuit extends from (+), including contact 179 of oscillator 120CT¹, front contact 118 of the relay 10S, back contact 49 of relay 9H, and winding of relay 10CP, to (−).

The shifting of the driven code to a 120 code for the track section 10T causes the picking up at the right-hand end of such track section of the relay 10D¹ (see Fig. 2C) because the circuit for such relay is tuned to the 120 code, the tuned circuit for that relay being connected across the primary winding of the transformer 10TF¹. Upon the picking up of the relay 10D¹, the shifting of contact 121 of such relay changes the rate transmitted by the relay 12CP for the track section 11–12T. Thus, with the relay 10D¹ picked up, the relay 12CP is active for the transmission of a 120 driven code by the energization of a circuit extending from (+), including contact 184 of oscillator 120CT², front contact 121 of relay 10D¹, back contact 57 of relay 10–12D, back contact 58 of relay 12S, front contact 59 of relay 10H¹, and winding of relay 12CP, to (−).

At the right-hand end of the track section 11–12T, the reception of the 120 driven code causes the picking up of the relay 11–13D¹ (see Fig. 2D) as such relay is connected across the primary winding of the transformer 11TF in accordance with the closure of front contacts 144 and 145 of the relay 11H. The picking up of such relay opens the circuit by which the relay 13CP¹ has been active for the transmission of a 180 driven code at back contact 63, and the closing of front contact 63 establishes a circuit by which the relay 13CP¹ repeats the impulses of the oscillator 120CT³. Such circuit extends from (+), including contact 177 of relay 120CT³, front contact 63 of relay 11–13D¹, front contact 64 of relay 11H, and winding of relay 13CP¹, to (−). At the right-hand end of the track section 13T, the change in the driven code from a 180 code to a 120 code causes the relay 13–14D (see Fig. 2E) to be dropped away as such relay is tuned to the 180 code, and causes the relay 13D which is tuned to the 120 code to be picked up. The dropping away of the relay 13–14D reverses the polarity for the signal 13 in an obvious manner upon the shifting of contacts 71 and 74 to cause such signal to be put to caution.

In accordance with the picking up of the relay 13D responsive to the 120 driven code received at the right-hand end of track section 13T, a circuit is closed by which the relay 13CP becomes active for the transmission of an inverse code from right to left through the track section 13T. Such circuit extends from the upper terminal of the secondary winding 127 of transformer 13TF including front contact 178 of relay 13D, and lower winding of relay 13CP, to the lower terminal of the secondary winding 127 of transformer 13TF. Upon the reception of the inverse code at the left-hand end of track section 13T, the relay 13H¹ (see Fig. 2D) is again picked up, and the picking up of such relay closes a circuit at front contact 79 whereby the relay 11CP becomes active for the transmission of an inverse code from right to left through the track section 11–12T.

At the left-hand end of track section 11–12T, the reception of an inverse code causes the relay 12H (see Fig. 2C) to be again picked up, and the picking up of such relay renders the relay 10CP¹ active for the transmission of an inverse code through the track section 10T by the closure of front contact 83.

At the left-hand end of the track section 10T, the reception of the inverse code causes the relay 10H (see Fig. 2B) to be again picked up, but the relay 10D remains dropped away because the code rate has been changed in the track section 10T to a 120 rate. Such being the case the signal 10 is put to caution by the energization of its winding by a circuit closed in accordance with the picked up condition of the relay 10H and the dropped away condition of the relay 10D.

It will be noted from the circuits that have just been described whereby the presence of an east bound train in the track section 8-9T is partially responsible for the shifting of the indication of signal 10 from a clear to a caution indication, that the mode of operation is such as to check the operation of the stick relay 10S. That is, the picking up of the relay 10S is essential to the shifting of the code rate for the track section 10T, but if such relay fails to be picked up, the signal 10 will be put to stop as there will be no inverse code established for the subsequent energization of the relay 10H. In other words, the picking up of the relay 10S is checked by making the shifting of the code rate essential to the reestablishment of the inverse code in the track section 10T for the control of signal 10. Thus, if the stick relay 10S fails to be picked up, the leaving signal 10 is put to stop, and the east bound train will not be allowed to pass as the signal 10 is a stop-and-stay signal.

*Meeting of trains.*—The mode of operation of the system for the meeting of trains involves the principles as heretofore set forth with respect to considering the passage of east and west bound trains respectively, and it is believed with the description as heretofore set forth in mind, that the conditions of the system for the meeting of trains as illustrated, for example, in Fig. 1I through Fig. 1L, will be readily understood. With reference to Fig. 1I, it will be noted that the conditions of code transmission which exist when trains A and B occupy respective siding sections 2-3T and 14-15T correspond to the conditions illustrated for the respective east and west bound trains which occupy the siding sections as illustrated in Fig. 1B.

As further progress of the trains is considered, however, the entrance of the train A into the stretch of single track between the siding 23 and 24 causes the putting to stop of signals 5, 7 and 9. In a similar manner the entrance of the train B into the stretch of single track between the sidings 24 and 25 causes the opposing signals 10 and 12 to be put to stop by the removal of the inverse code normally transmitted through the track sections 10T and 11-12T. Due to the dropping away of the relays 9H and 10H, the pick-up circuit which has been described is conditioned for the picking up of the stick relay 10S. The picking up of the relay 10S of course selects a 120 driven code for transmission through the track section 10T in a manner which has been described, and the reception at the right-hand end of such track section of the 120 code causes the transmission of a 120 driven code through the track section 11-12T for the caution indication of signal 11. An inverse code cannot be transmitted back through the track section 11-12T, however, because the circuit for its upper winding is open at this time at front contact 79 of relay 13H¹ (see Fig. 2D) because of the shunting by the train of the track section 13T.

It will be noted that the entrance of the train A into the stretch of single track between the sidings 23 and 24 causes a reversal in the direction of driven code transmission through the track sections 5-6T, 7T and 8-9T in a manner which has been described on considering the passage of an east bound train, but the codes transmitted are different than those which have been described because of the presence of the opposing train B. Thus, the 75 code is selected for transmission through the track section 8-9T because of a circuit closed for the transmitter relay 9CP (see Fig. 2B) at the right-hand end of track section 8-9T extending from (+), including contact 200 of oscillator 75CT¹, back contact 104 of relay 10H, upper winding of relay 9CP, and back contact 105 of relay 9H, to (—). The reception at the left-hand end of track section 8-9T of the 75 code causes the relay 8H (see Fig. 2A) to be picked up, but the relay 7-8D is dropped away because of the particular code received. Under such conditions, with the relay 7H dropped away because of there being no code transmitted through the track section 7T from left to right, the signal 8 is energized with a polarity to cause that signal to be put to caution by a circuit closed from (+), including back contact 47 of relay 7H, back contact 111 of relay 7-8D, front contact 110 of relay 8H, winding of signal 8, front contact 109 of relay 8H, and back contact 108 of relay 7-8D, to (—).

The picked up condition of the relay 8H in combination with the deenergized condition of relays 7H and 7-8D closes an obvious circuit at contact 203 of oscillator 120CT to cause the code transmitter relay 7CP to be active for the transmission of a 120 code from right to left through the track section 7T. The apparatus for the reception for such code at the left-hand end of that track section of course corresponds to that illustrated for the left-hand end of track section 13T in the stretch of single track between the sidings 24 and 25.

With reference to Fig. 1K it is assumed that the train B has passed the signal 9 which is at stop, and is to enter the passing siding 24 for the meeting of the two trains. The reversal of the track switch for the right-hand end of the siding 24 of course causes the shunting of the track section 8-9T by the closure of contact 201 (see Fig. 2B) of the switch circuit controller for the track switch at that end, and the shunting of such track circuit causes the relay 8H (see Fig. 2A) at the left-hand end thereof to be dropped away. The dropping away of such relay opens the circuit for signal 8 at front contacts 109 and 110 to cause that signal to be put to stop. The dropping away of relay 8H selects a 120 code for transmission from right to left through the track section 7T by the shifting of contact 113 so as to cause the next signal in the rear to be put to caution. It will be noted at this point that the shunting of the track section 8-9T by the switch circuit controller for the right-hand end of the siding 24 is ineffective to cause the picking up of the approach relay 7AR as the characteristics of that relay are such as to cause it to be picked up only when the left-hand portion of the track section 8-9T has been shunted. Inasmuch as the approach relay 7AR does not pick up under such conditions, the stick relay 7S remains dropped away.

When the track section 10T becomes unoccupied in the rear of the west bound train B as illustrated in Fig. 1K, the normal conditions are restored in the rear of the train in a manner which has been described when passage of a west bound train alone has been considered, except that the code for transmission through the track sections 10T and 11-12T is a 120 code rather than a 180 code. This is true because of the energized condition of the stick relay 10S, such relay being effective to cause the transmission of a 120 code in a manner which has been described when considering the conditions of simultaneous entry to the stretch of single track between the sidings 24 and 25.

The 120 code rate transmitted from left to right through each of the track sections 10T, 11–12T and 13T will be effective for the meeting of trains under the conditions which have been assumed until the passage of the east bound train A out of the track section 8–9T is effective to allow the picking up of the relay 9H. The picking up of such relay allows the stick relay 10S to be dropped away, and the dropping away of such relay allows restoration in the rear of the east bound train to become effective in a manner which has been described after such train has passed through the stretch of single track between the sidings 24 and 25.

Restoration for the conditions of the signals for the stretch of single track between the sidings 23 and 24 becomes effective after such stretch of track has become unoccupied in the rear of the train A in a manner corresponding to restoration in the rear of an east bound train as it has been considered. Such restoration is effective to cause the clearing of the signals 5 and 7 for governing passage of the west bound train B through such stretch of single track. Therefore the train B is free to proceed toward the siding 23 as soon as the train A has passed the track switch at the left-hand end of siding 24.

*Following trains.*—Inasmuch as the characteristics of the system provided by the present invention are such as to make the direction of code transmission through the various track sections under certain conditions dependent upon the approach of trains, the signal indications provided in the rear of a train vary in accordance with whether or not there is a train following. In other words, the system has a normal tendency to restore itself to the normal conditions of the system where certain of the signals are normally at stop, and restoration is made to such conditions unless such restoration is prevented by the approach of a second train.

More specifically, for example, with reference to Fig. 1M, it will be noted that the signals 8 and 10 are at stop in accordance with the attempt of the system to restore to normal in the rear of the east bound train B. The following east bound train A is not sufficiently close to the train B to prevent such restoration from becoming effective. However, in Fig. 1N, the train A having entered the stretch of single track between the sidings 23 and 24 has caused the dropping away of the relay 9H for the right-hand end of the track section 8–9T in accordance with the usual tumble-down arrangement. The dropping away of the relay 9H, with the relay 10H dropped away because of the presence of the train B in the stretch of single track between the sidings 24 and 25 causes the stick relay 10S (see Fig. 2B) to be picked up. The picking up of the stick relay 10S selects a 120 driven code in a manner which has been described for transmission from left to right through the track section 10T. The reception of the 120 code at the right-hand end of track section 10T together with the energized condition of the east stick relay 12S (see Fig. 2C) establishes a condition by which the code transmitter relay for the right-hand end of track section 10T becomes active for the transmission of an inverse code for the control of signal 10. Because of the 120 code in the track section 10T, the signal 10 is put to caution to indicate to a following train that the signal 12 is at stop because of the train in the block immediately in advance thereof.

To consider more specifically the circuts which provide the above described mode of operation, it will be assumed that the stick relay 10S has been picked up in accordance with a mode of operation similar to that which has been described when considering the conditions of simultaneous entry of trains. The picking up of the stick relay 10S closes a circuit at front contact 118 by which the relay 10CP (see Fig. 2B) becomes active for the transmission of a 120 code from left to right through the track section 10T.

At the right-hand end of the track section 10T, the reception of the 120 code causes the picking up of the relay 10D¹ (see Fig. 2C) which is tuned to that code, and the picking up of that relay with the stick relay 12S picked up provides a circuit by which the relay 10CP¹ becomes active for the transmission of an inverse code from right to left through the track section 10T. The relay 10CP¹ is active under such conditions because of the closure of a circuit for its lower winding extending from the upper terminal of the secondary winding 82 of transformer 10TF¹, including front contact 160 of relay 10D¹, front contact 202 of relay 12S, back contact 83 of relay 12H, and lower winding of relay 10CP¹, to the lower terminal of the secondary winding 82 of transformer 10TF¹.

The reception of the inverse code at a 120 rate at the left-hand end of track section 10T causes the picking up of the relay 10H but the relay 10D remains dropped away. The conditions are therefore established whereby the winding of signal 10 is energized with a polarity to cause such signal to display a caution indication.

After the first east bound train B has left the stretch of single track between the sidings 24 and 25 as illustrated in Fig. 1P, restoration becomes effective for code transmission through the track sections 11–12T and 13T in a manner corresponding to that which has been described when considering the passage of an east bound train, except that the codes transmitted through the track sections of the stretch of single track between the sidings 24 and 25 is a 120 code rather than a 180 code because of the picked up condition of the stick relay 10S dependent upon the following train A.

The reception of the 120 code at the right-hand end of track section 13T causes the relay 13CP (see Fig. 2E) to become active for the transmission of an inverse code from right to left through such track section in accordance with the closure of contact 173 of the relay 13D which is picked up because of the 120 driven code received at that end of the track section.

The reception at the left-hand end of track section 13T of such inverse code causes the relay 13H¹ (see Fig. 2D) to be picked up, and the energization of that relay upon the closure of front contact 79 renders the code transmitter relay 11CP active for the transmission of an inverse code from right to left through the track section 11–12T. At the left-hand end of track section 11–12T, the picking up of the relay 12H (see Fig. 2C) by the closure of front contact 83 shunts the contacts 160 and 202 of relays 10D¹ and 12S respectively out of the circuit for the lower winding of the code transmitter relay 10CP¹. Thus, the relay 10CP¹ is maintained active for the transmission of an inverse code from right to left through the track section 10T. The signal 12 is at stop under such conditions because of the energized condition of the relay 10H¹ for the right-hand end of track section 10T. This of course is in accordance with the use of the relay 10–12D for both directions of traffic. As soon as the track section 10T becomes occupied by the east bound train A, the dropping away of the relay 10H¹ will render the energization effective for signal 12 to cause such signal to be put to caution.

It is believed from the specific conditions of following train movements which have been described, in view of the description as it has been set forth for the passage of single east bound trains, the mode of operation will be readily understood for other traffic conditions involving following train movements. Inasmuch as the normal direction of driven code transmission through the various track sections is not changed for the passage of west bound trains, it is believed to be readily apparent from the description as it has been set forth with respect to the passage of a single west bound train how the proper indications are provided for following trains.

Having described a block signaling system for a particular stretch of single track as one specific embodiment of the present invention, it is desired to be understood that this form is selected to facilitate in the disclosure of the present invention rather than to limit the number of forms which the invention may assume, and it is to be further understood that various adaptations, alternations and modifications may be applied to the specific form shown to meet the requirements of practice, without in any manner departing from the spirit or scope of the present invention except as limited by the appending claims.

What I claim is:

1. In a block signaling system for a stretch of single track divided into blocks and having associated therewith two passing sidings spaced a plurality of blocks apart, each siding having a leaving signal for governing traffic toward the other siding; track circuit code communication means for the various blocks operable to communicate selected signal controls in both directions through the stretch of track between the sidings by distinctive driven and inverse codes; signal control selecting means associated with a particular one of the leaving signals effective to select a particular control for communication by track circuit code to the opposing leaving signal even though there is a train in approach to such particular leaving signal but the trackway in approach to the opposing leaving signal is unoccupied; signal control selecting means associated with said particular leaving signal effective to select another control for communication by track circuit code to the opposing leaving signal if there is a train in approach to each of the leaving signals; and signal control means for said opposing leaving signal effective to cause such signal to indicate clear if said particular control is selected, and effective to cause such opposing signal to indicate caution if said another control is selected.

2. In a signaling system of the character described for a stretch of track divided into blocks and having two passing sidings spaced a plurality of blocks apart, each of the sidings having a leaving signal for governing traffic toward the other siding; track circuit code communication means for each of the blocks including code transmitters and receivers selectively operable to communicate by continuous distinctive driven and inverse codes of impulses various distinctive signal controls in both directions, the codes being distinctive because of the rate of impulse transmission; circuit means at the leaving signal at a particular one of the sidings effective in response to the presence of a train in the approach section to such leaving signal for rendering the transmission of impulses effective at a given rate in the block immediately in advance of such leaving signal if the track in approach to the opposing leaving signal is unoccupied; circuit means responsive to the presence of a train in approach of each of the leaving signals for rendering the code transmitter for the leaving signal at said particular siding effective to cause the transmission of impulses at another rate in the block immediately in advance of that leaving signal; circuit means effective when the stretch of track between the two sidings is unoccupied for rendering the transmission of an inverse code effective in the block immediately in advance of the leaving signal for said particular siding for the control of such signal; and signal control means for the leaving signal at said particular siding effective to cause such signal to indicate clear when said given rate is transmitted in the block immediately in advance of such signal, and effective to cause such signal to indicate caution when said another rate is transmitted in that block.

3. In a block signaling system of the character described for a stretch of single track divided into blocks and having two passing sidings spaced a plurality of blocks apart, each siding having a leaving signal for governing traffic toward the other siding; track circuit code communication means for the various blocks normally operable to communicate selected signal controls in both directions through that block by continuous distinctive codes of impulses, the codes being distinctive because of the selected rates of impulse transmission; a stick relay for a given leaving signal; circuit means for energizing said stick relay when each of the opposing leaving signals is being approached by a train, the approach of a train to the opposing leaving signal being indicated at the siding where such given signal is located by the energization of the stick relay at such siding in response to the removal of the track circuit code normally transmitted for the control of said given leaving signal; stick circuit means for maintaining said stick relay energized as long as there is a train in approach of said given signal; signal control selecting means at said given leaving signal operable to select a particular control for communication by track circuit code to the opposing leaving signal if there is a train in approach of such given signal and said stick relay is deenergized; signal control selecting means at said given signal operable to select another control for communication by track circuit code to the opposing leaving signal if there is a train in approach of said given signal and said stick relay is energized; and signal control means at said opposing signal operable to cause such signal to indicate clear if said particular control has been communicated by track circuit code and operable to cause such signal to indicate caution if said another control is communicated.

4. In a block signaling system for a stretch of single track divided into blocks having two passing sidings spaced a plurality of blocks apart, each of the sidings having a leaving signal for governing traffic toward the other siding; track circuit code communication means for the various blocks operable to communicate by distinctive driven and inverse codes selected signal controls in both directions through the stretch of track between the sidings; signal control selecting means at each of the leaving signals effective to select a particular control for communication by track circuit code to the opposing leaving signal if there is a train in approach to a given one of the leaving signals but the trackway in approach to the other leaving signal is unoccupied; signal control selecting means at each of the leaving signals effective to select another control for communication by track circuit code to the opposing leaving signal if there is a train in approach to each of the leaving signals; and signal control means for each of the leaving signals effective to cause such signal to display one indication if said particular control is selected, and effective to cause such signal to display another indication if said another control is selected.

5. In a block signaling system for a stretch of track divided into blocks and having first and second passing sidings spaced a plurality of blocks apart, each siding having a leaving signal for governing traffic toward the other siding; track circuit code communication means for each of the blocks including code transmitters and receivers selectively operative to communicate various signal controls in both directions by distinctive continuous driven and inverse codes, the various codes being distinctive because of selected rates of impulses transmitted; circuit means at said first siding for rendering the code transmitter for the block in advance of the leaving signal at said first siding effective for the transmission of impulses at a given rate forming a driven code if there is a train in approach of such leaving signal but the trackway in approach to the opposing leaving signal for the second siding is unoccupied, such circuit means being effective to cause that code transmitter to transmit impulses at another rate if there is a train in approach to each of said leaving signals; circuit means for the block in advance of the leaving signal at said first siding effective to cause the transmission of an inverse code through such block for the control of that leaving signal if the stretch of track between said first and second sidings is unoccupied; and signal control means for the leaving signals effective to cause both of said leaving signals to indicate clear when said given rate is transmitted, and effective to cause such signals to indicate caution when said another rate is transmitted.

6. In a block signaling system for a stretch of single track having two adjacent sidings spaced a plurality of blocks apart, each siding having a leaving signal for governing traffic toward the other siding; track circuit code communication means for the various blocks normally operable to communicate selected signal controls in both directions by continuous distinctive codes of impulses, the codes being distinctive because of the different rates of impulse transmission; a stick relay for a given leaving signal; circuit means responsive to the presence of a train in approach of each of the leaving signals for energizing said stick relay, the approach of a train to the opposing leaving signal being manifested by the removal of the code normally transmitted for the control of said given signal through the block in advance thereof; stick circuit means for maintaining said stick relay energized as long as there is a train in approach of said given signal, irrespective of the restoration of code transmission for the control of such given signal; signal control selecting means at said given leaving signal operable to select a particular control for communication by track circuit code to the opposing leaving signal if there is a train in approach of such given signal and if said stick relay is deenergized; signal control selecting means at said given leaving signal operable to select another control for communication by track circuit code to the opposing leaving signal if there is a train in approach of said given signal and if said stick relay is energized; signal control selecting means at said opposing signal operable upon the reception by track circuit code of said another control to cause the restoration of track circuit code transmission for the control of said given leaving signal; the code transmitted for its control being at a different rate than that transmitted when the trackway in approach to said opposing leaving signal is unoccupied; signal control means at said opposing signal operable to cause such signal to indicate clear if said particular control has been communicated by track circuit code and operable to cause such signal to indicate caution if said another control is communicated; and signal control means at said given leaving signal operable to cause such signal to indicate clear if there is a train in approach of such signal and said stick relay is deenergized, and operable to cause such signal to indicate caution if a track circuit code is received for the control of such signal and said stick relay is picked up.

7. In a block signaling system of the character described for a stretch of track including a double signal location and a track section extending each way therefrom; code communication means for each of the track sections including a code transmitter and code receiver operable when rendered active to communicate signal controls through the rails to said signal location by distinctive continuous codes of impulses, the codes being distinctive because of the selected rate of impulse transmission; circuit means for rendering said communication means normally active for each track section, such circuit means being effective to render said code communication means selectively inactive for either of said track sections, dependent upon traffic conditions; a signal control relay at said signal location for each of the track sections; circuit means for energizing said signal control relay for each track section responsive to the activity of said code communication means for that section, irrespective of the rate of impulse transmission; a distant control relay at said signal location selectively associated with one or the other of said track sections having a circuit tuned to be responsive only to a given rate of impulse transmission; circuit means dependent upon the energization of said signal control relay for a given track section for rendering said tuned circuit responsive to the code in that track circuit; circuit means dependent upon the deenergization of said signal control relay for said given track section for rendering said tuned circuit responsive to the code in the other track section; and signal control means for each of the signals effective to cause such signal to indicate clear when said distant relay is energized if its tuned circuit is responsive to the track section in advance of that signal, and effective to cause such signal to indicate caution if said signal control relay for the track section in advance of that signal is energized and said distant relay is deenergized.

8. In a block signaling system of the character described for a stretch of single track having several track sections extending between passing sidings and intermediate signals for governing passage of trains through such stretch of track in both directions; track circuit code communication means for each of the track sections normally operative to communicate signal controls in both directions by driven and inverse codes, the direction of driven code transmission being selected by traffic conditions; code direction selecting means for each of the unoccupied track sections in advance of a train in said stretch of track effective to cause a driven code to be transmitted toward the front of the train in such track sections, such circuit means being effective only after the train has entered such stretch of track; code direction selecting means for each of the track sections effective to cause a driven code to be transmitted in both directions momentarily when such track section is unoccupied in the rear of a train if reversal in direction of driven code transmission has been previously effected by the presence of that train, such code direction selecting means being effective to solve the momentary code contest between the transmitters for the opposite ends of the track section in favor of a predetermined normal direction of code transmission; and signal control means for each of said intermediate signals effective to cause such signal to clear in accordance with the reception of a particular driven code communicated through the rails of the track section in advance of such signals.

9. In a block signaling system for a stretch of single track having a pair of staggered intermediate signals and a plurality of track sections between passing sidings; track circuit code communication means for each of the track sections normally active to communicate selected signal controls in both directions by driven and inverse codes, the codes being distinctive because of the rate of impulse transmission; signal control selecting means for the various track sections effective to remove all codes transmitted for communication of signal controls to opposing signals in said stretch of track when such stretch is entered by a train; a directional stick relay for each of the intermediate signals; circuit means for energizing said stick relay for each intermediate signal when that signal is passed by a train moving in a direction to be governed thereby; stick circuit means for maintaining said stick relay for each intermediate signal picked up as long as said stretch of track is occupied by a train proceeding in a direction governed by such signal; circuit means dependent upon the energized condition of said stick relay for each signal for preventing the transmission of a code toward the train in advance of the signal which has its stick relay in an energized condition; and signal control means effective to cause such signal to clear only when a track circuit code is transmitted toward such signal in the track section in advance thereof.

10. In a block signaling system for a stretch of single track having an intermediate signal for governing traffic in each direction and having several track sections between passing sidings; track circuit code communication means for each of the track sections normally active to communicate selected signal controls in both directions by driven and inverse codes, the codes being distinctive because of the rate of impulse transmission; signal control selecting means for the various track sections effective to remove all signal controls communicated by track circuit codes to opposing signals in said stretch of track when it is entered by a train; directional stick circuit means for each of the intermediate signals distinctively conditioned by the acceptance of such signal by a train and maintained so conditioned as long as that train occupies said stretch of track; circuit means dependent upon said distinctive conditioning of said stick circuit means upon the passage of a train for preventing the communication of signal controls by track circuit codes through the track section in advance of the signal which has its directional stick circuit means conditioned; signal control selecting means at a particular one of the sidings operable to cause the communication of a distinctive signal control through the track sections so as to be effective to cause the restoration of said stick circuit means in the rear of a train, such signal control selecting means being effective only after the entire stretch of single track has become unoccupied in the rear of the train; and signal control means effective to cause each of the intermediate signals to clear only when a track circuit code is transmitted toward such signal in the track section in advance thereof.

11. In a block signaling system for a stretch of single track extending between passing sidings, each siding having a leaving signal for governing traffic toward the other siding; track circuit signal control communication means for the various blocks operable by selected distinctive driven and inverse codes of continuous impulses to communicate signal controls from one siding to the other and from the other to said one siding dependent upon traffic conditions, said communicating means including means to cause each of said leaving signals to indicate clear if it is approached by a train and there is no opposing train present in the stretch of single track or at the next siding and to cause each of said leaving signals to indicate caution due to a tumble down only if there are opposing trains simultaneously at the respective sidings with the stretch of single track unoccupied.

12. In a block signaling system, the combination with two passing sidings connected by a single track stretch divided into a plurality of blocks, a leaving signal for each passing siding for governing the movement of traffic into such stretch and toward the other siding, track circuit code communicating means for each of the blocks operable to communicate selected signal controls in both directions through said single track stretch by distinctive driven and inverse codes, signal control selecting means associated with each of said leaving signals effective to select a particular signal control for transmission through the track circuits of said blocks to the opposing leaving signal when there is a train in approach to the leaving signal under consideration but the trackway in approach to such opposing leaving signal is unoccupied, other signal control selecting means including said first mentioned signal control selecting means associated with each of said leaving signals effective to select another signal control for transmission through the track circuits of said blocks to the opposing leaving signal when there is a train on the trackway in approach to each of said leaving signals, and receiving and signal control means for each of said leaving signals to cause such leaving signal to display one signal indication if said particular control for that signal is transmitted thereto and effective to display another signal indication if said another control for that signal is transmitted thereto.

13. In a block signaling system, the combination with two passing sidings connected by a single track stretch divided into a plurality of blocks, a leaving signal for each passing siding for governing the movement of traffic into such stretch and toward the other siding, track circuit code communicating means for each of the blocks operable to communicate selected signal controls in both directions through said single track stretch by distinctive driven and inverse codes, signal control selecting means associated with each of said leaving signals effective to select a particular signal control for transmission through the track circuits of said blocks to the opposing leaving signal when there is a train in approach to the leaving signal under consideration but the trackway in approach to such opposing leaving signal is unoccupied, other signal control selecting means including said first mentioned signal control selecting means associated with each of said leaving signals effective to select another signal control for transmission through the track circuits of said blocks to the opposing leaving signal when there is a train on the trackway in approach to each of said leaving signals, signal control means for each of said leaving signals to cause such leaving signal to display one indication if said particular control is transmitted thereto and effective to display another indication if said another control is transmitted thereto, and means including said signal control selecting means to cause either of said leaving signals to indicate stop if the train in approach to the opposing signal passes such opposing signal.

14. In a block signaling system; the combination with two passing sidings connected by a single track stretch divided into a plurality of blocks; a leaving signal for each passing siding for governing the movement of traffic into such stretch and toward the other passing siding; track circuit code communicating means for each of the blocks operable to communicate selected signal controls in both directions through said single track stretch by distinctive driven and inverse codes; signal control selecting means associated with one of said leaving signals effective to select a particular signal control for transmission through the track circuit code communicating means of said blocks to the opposing leaving signal when there is a train in the approach section to such one leaving signal but there is no train in the approach section to said opposing leaving signal; another signal control selecting means associated with said opposing leaving signal effective to select a specific signal control for transmission through the track circuit code communicating means of said blocks to said one leaving signal when there is a train in the approach section to such opposing leaving signal but there is no train in the approach section to said one leaving signal; signal control means to cause said opposing signal to indicate clear if said particular signal control is transmitted thereto and to cause said one signal to indicate stop if said specific signal control is transmitted thereto; and means including said signal control selecting means, said signal control means and the track circuit code communicating means to cause both of said leaving signals to indicate caution if there are trains in the approach sections to both of said leaving signals provided the single track stretch is unoccupied.

15. In a block signaling system; the combination with two passing sidings connected by a single track stretch divided into a plurality of blocks; a leaving signal for each passing siding for governing the movement of traffic into such stretch and toward the other siding; track circuit code communicating means for each of the blocks operable to communicate selected signal controls in both directions through said single track stretch by distinctive driven and inverse codes; signal control selecting means associated with one of said leaving signals effective to select a particular signal control for transmission through the track circuit code communicating means of said blocks to the opposing leaving signal when there is a train in the approach section to such one leaving signal but there is no train in the approach section to said opposing signal; another signal control selecting means associated with said opposing leaving signal effective to select a specific signal control for transmission through the track circuit code communicating means of said blocks to said one leaving signal when there is a train in the approach section to such opposing leaving signal but there is no train in the approach section to said one leaving signal; signal control means to cause said opposing signal to indicate clear if said particular signal control is transmitted thereto and to cause said one signal to indicate stop if said specific signal control is transmitted thereto; other means including said signal control selecting means, said signal control means and the track circuit code communicating means to cause both of said leaving signals to indicate caution if there are trains in the approach sections to both of said leaving signals provided the single track stretch is unoccupied; and means including said other means to cause both of said leaving signals to indicate stop if the train in approach to one of said signals passes such signal.

16. In a block signaling system, the combination with two passing sidings connected by a single track stretch divided into a plurality of blocks, a leaving signal for each passing siding for governing the movement of traffic into such stretch and toward the other passing siding, an approach control block in approach to each of said leaving signals, track circuit code communicating means for each of the blocks operable to communiate selected signal controls in both directions through said respective blocks by distinctive driven and inverse codes, signal control means associated with each of said leaving signals and controlled by the track circuit code communicating means of said blocks to cause each of said leaving signals to indicate clear when its approach control block is occupied by a train moving in the direction in which such leaving signal governs traffic, and other control means including said signal control means governed jointly by the presence of trains on both of said approach control blocks and through the medium of said track circuit code communicating means to cause both of said leaving signals to indicate caution when both of said approach control blocks are each occupied by a train moving in the direction in which the associated leaving signal governs traffic.

17. In a block signaling system, the combination with two passing sidings connected by a single track stretch divided into a plurality of blocks, a leaving signal for each passing siding for governing the movement of traffic into such stretch and toward the other passing siding, an approach control block in approach to each of said leaving signals, track circuit code communicating means for each of the blocks operable to communicate selected signal controls in both directions through said respective blocks by distinctive driven and inverse codes, signal control means associated with each of said leaving signals and controlled by the track circuit code communicating means of said blocks to cause each of said leaving signals to indicate clear when its approach control block is occupied by a train moving in the direction in which such leaving signal governs traffic, other control means including said signal control means governed jointly by the presence of trains on both of said approach control blocks and through the medium of said track circuit code communicating means to cause both of said leaving signals to indicate caution when both of said approach control blocks are each occupied by a train moving in the direction in which the associated leaving signal governs traffic, and means controlled through the medium of said track circuit code communicating means for causing each of said leaving signals to indicate stop when a train passes the other leaving signal in the direction in which such other leaving signal governs traffic.

NELSON B. COLEY.